Figure 1:
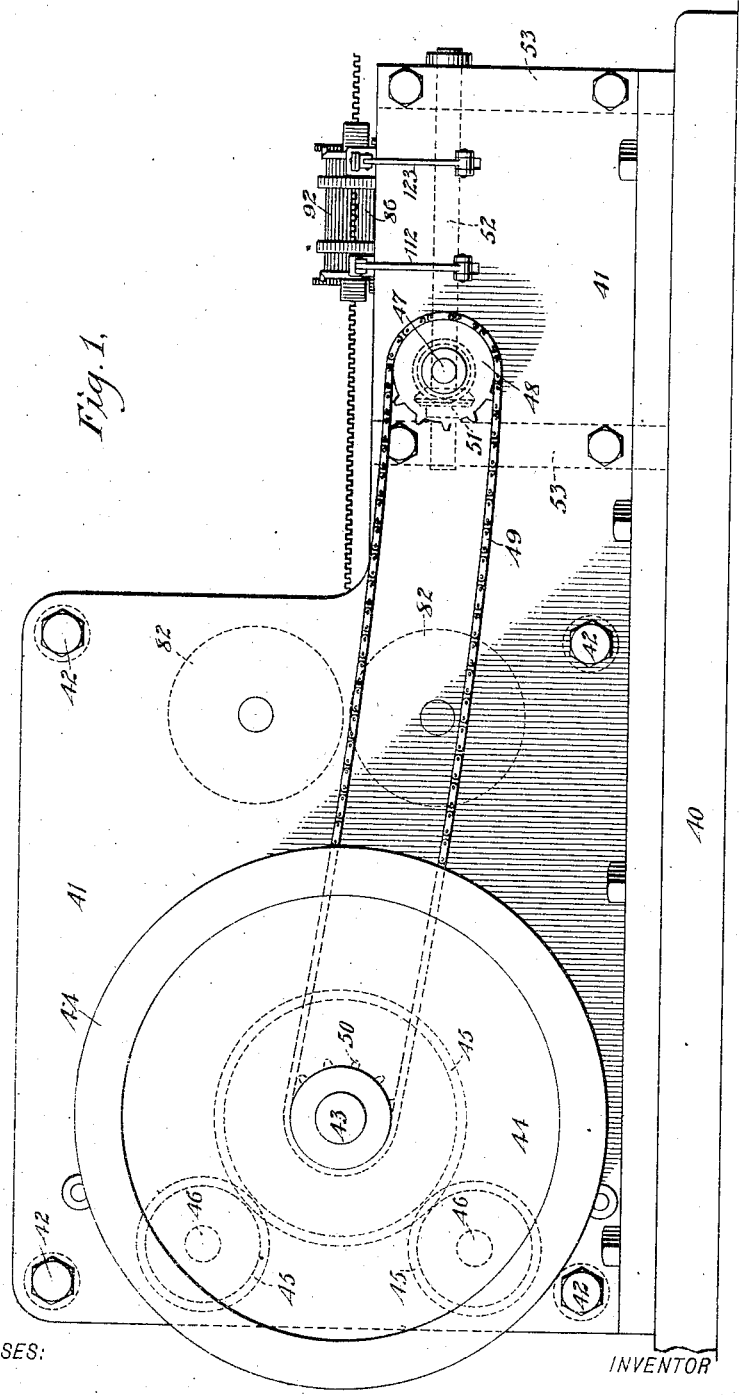

D McR. LIVINGSTON.
MACHINE FOR MAKING COOLER OR RADIATOR SECTIONS.
APPLICATION FILED FEB. 23, 1906.

985,686.

Patented Feb. 28, 1911.
15 SHEETS—SHEET 1.

WITNESSES:
Edward Thorpe.
Isaac B. Owens.

INVENTOR
D McRa Livingston
BY
Munn & Co
ATTORNEYS

D McR. LIVINGSTON.
MACHINE FOR MAKING COOLER OR RADIATOR SECTIONS.
APPLICATION FILED FEB. 23, 1906.

985,686.

Patented Feb. 28, 1911.
15 SHEETS—SHEET 4.

WITNESSES:
Edward Thorpe.
Isaac B. Owens.

INVENTOR
D McRa Livingston
BY
Munn & Co
ATTORNEYS

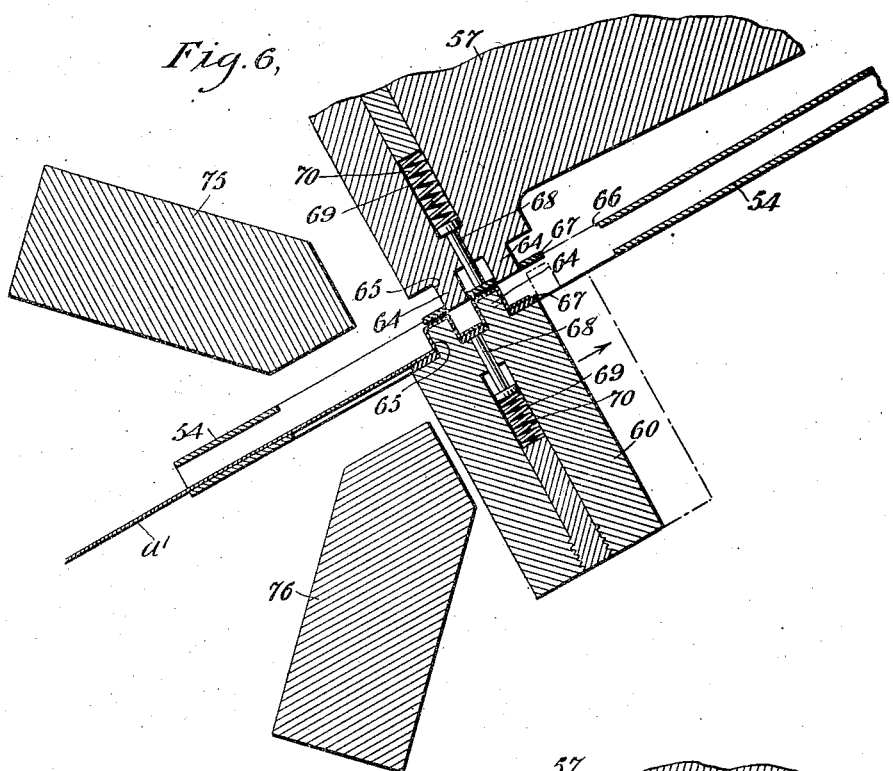
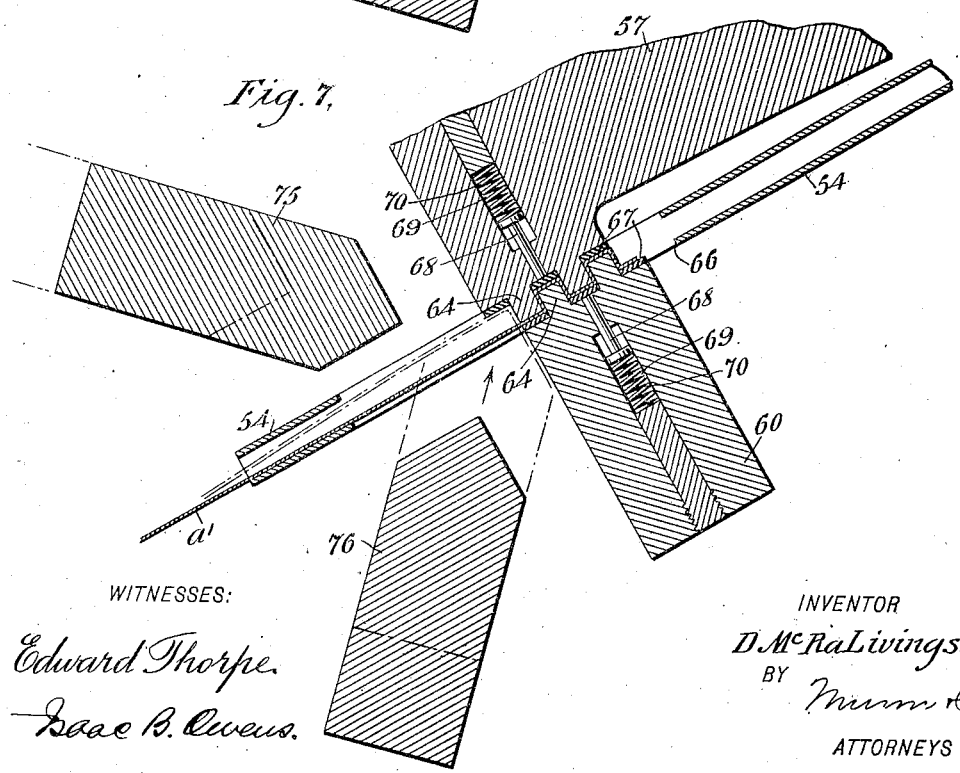

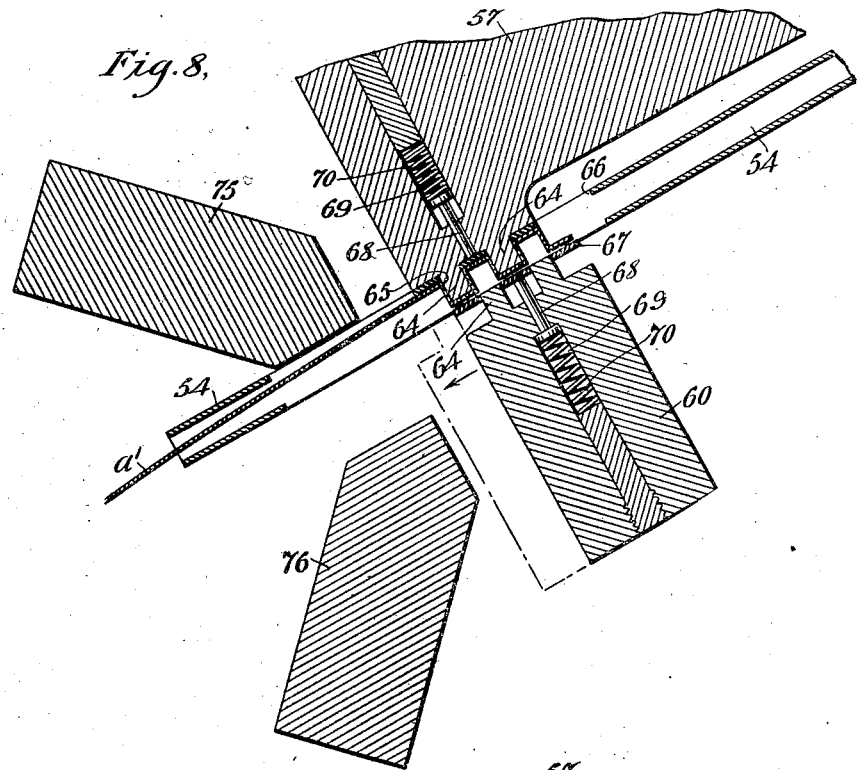
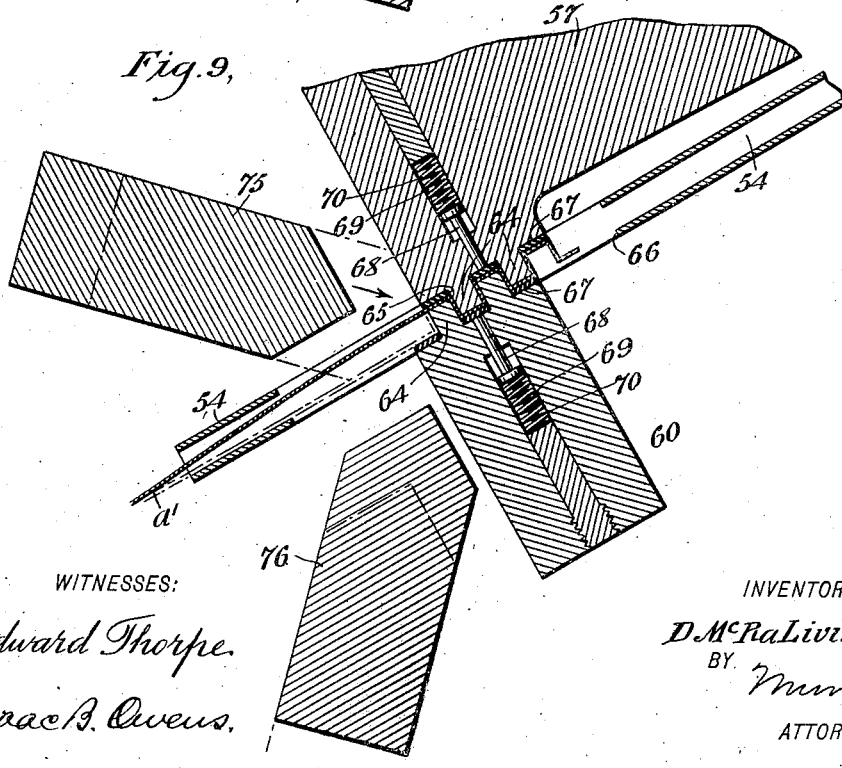

D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 7.
Fig. 10.
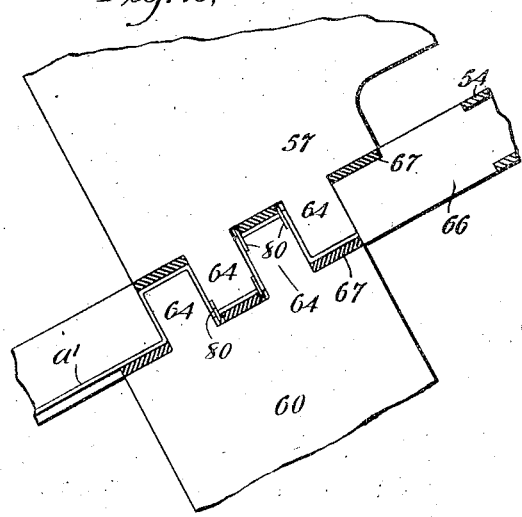
Fig. 11.
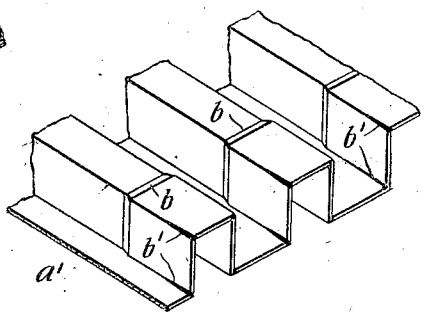
Fig. 30.
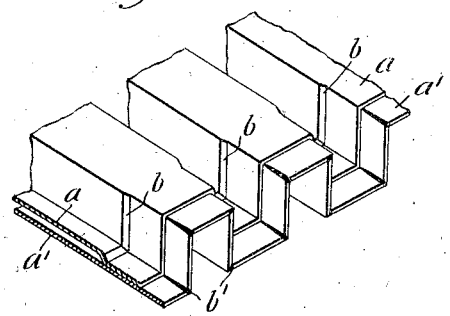
Fig. 31.
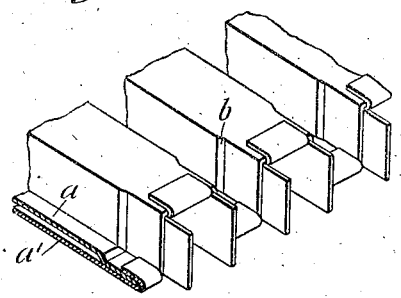
Fig. 32.
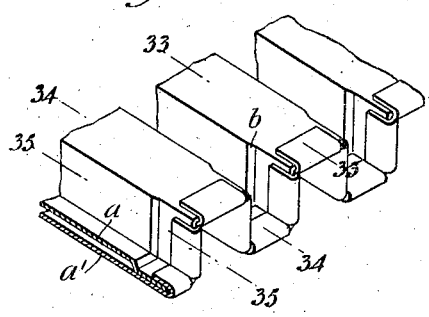
Fig. 33.
Fig. 34.
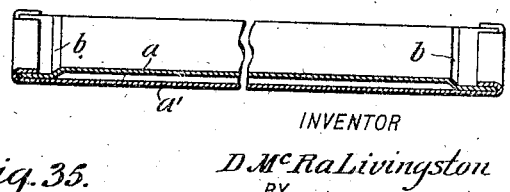
Fig. 35.
WITNESSES:
Edward Thorpe.
Isaac B. Owens.
INVENTOR
D McRa Livingston
BY
Munn & Co
ATTORNEYS D McR. LIVINGSTON.
MACHINE FOR MAKING COOLER OR RADIATOR SECTIONS.
APPLICATION FILED FEB. 23, 1906.

985,686.

Patented Feb. 28, 1911.
15 SHEETS—SHEET 8.

WITNESSES:
Edward Thorpe.
Isaac B. Owens.

INVENTOR
D. McRa Livingston
BY
Munn & Co
ATTORNEYS

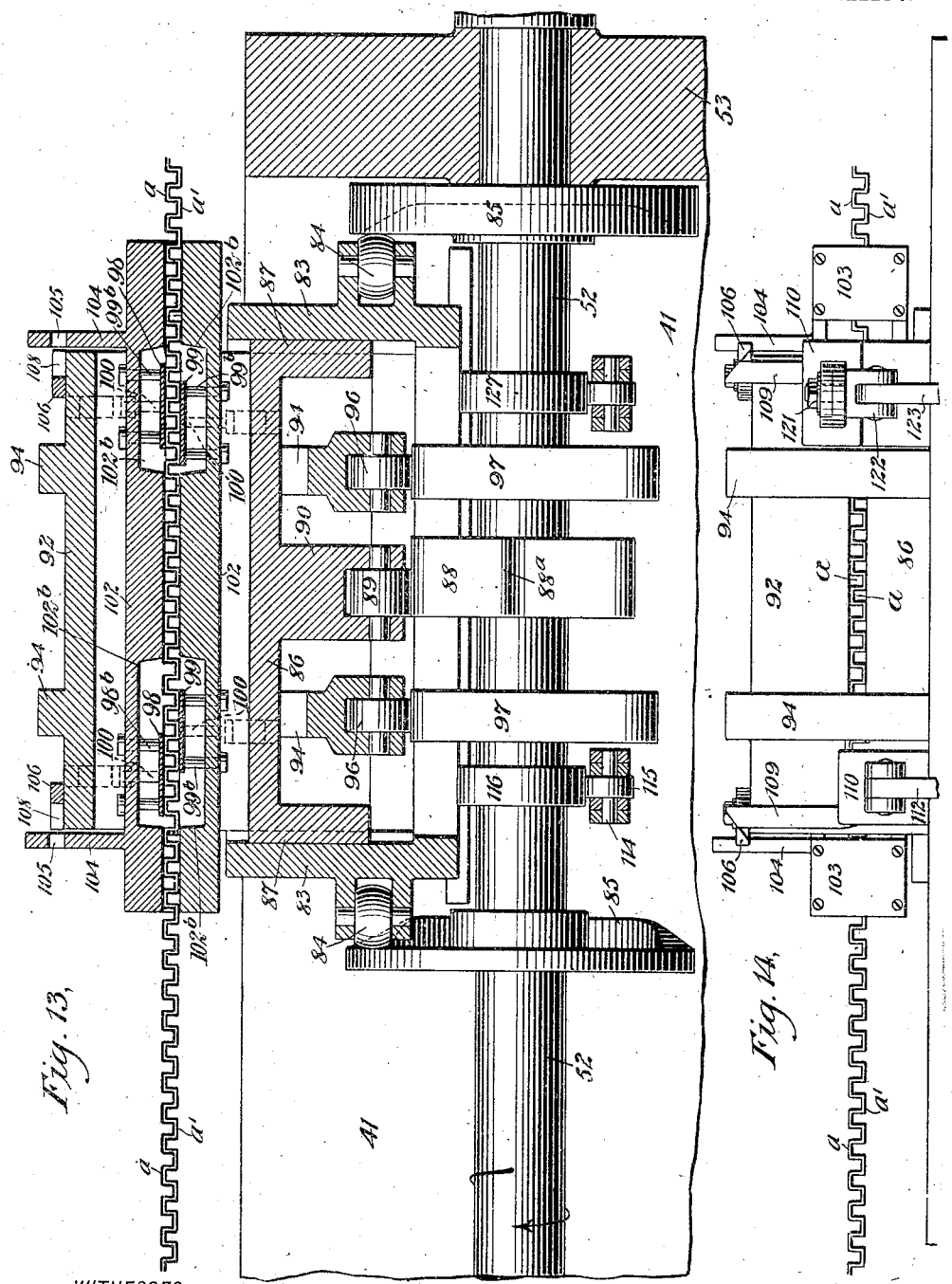

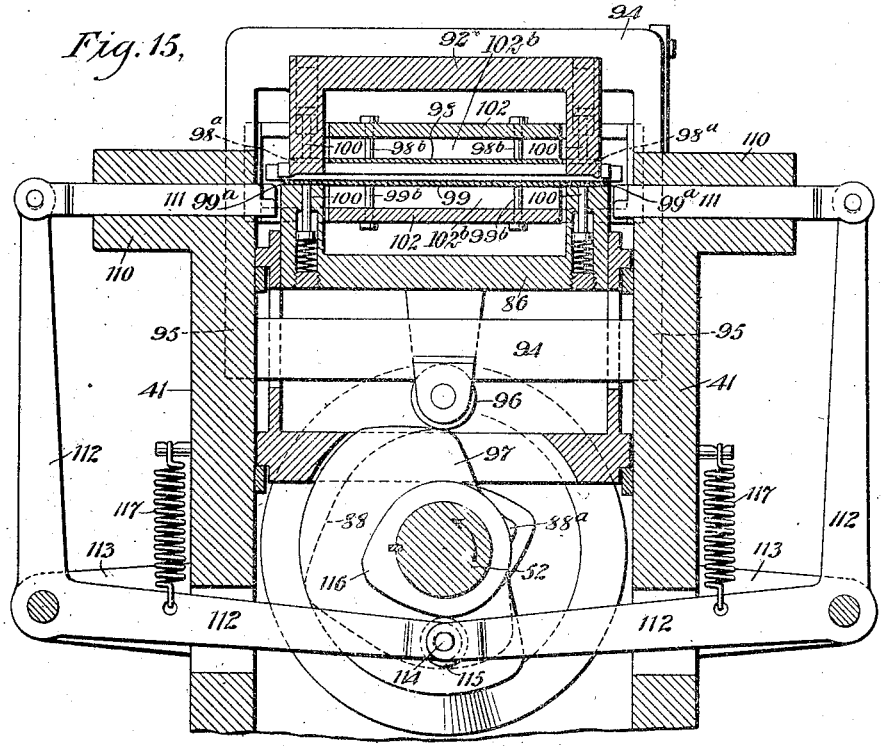
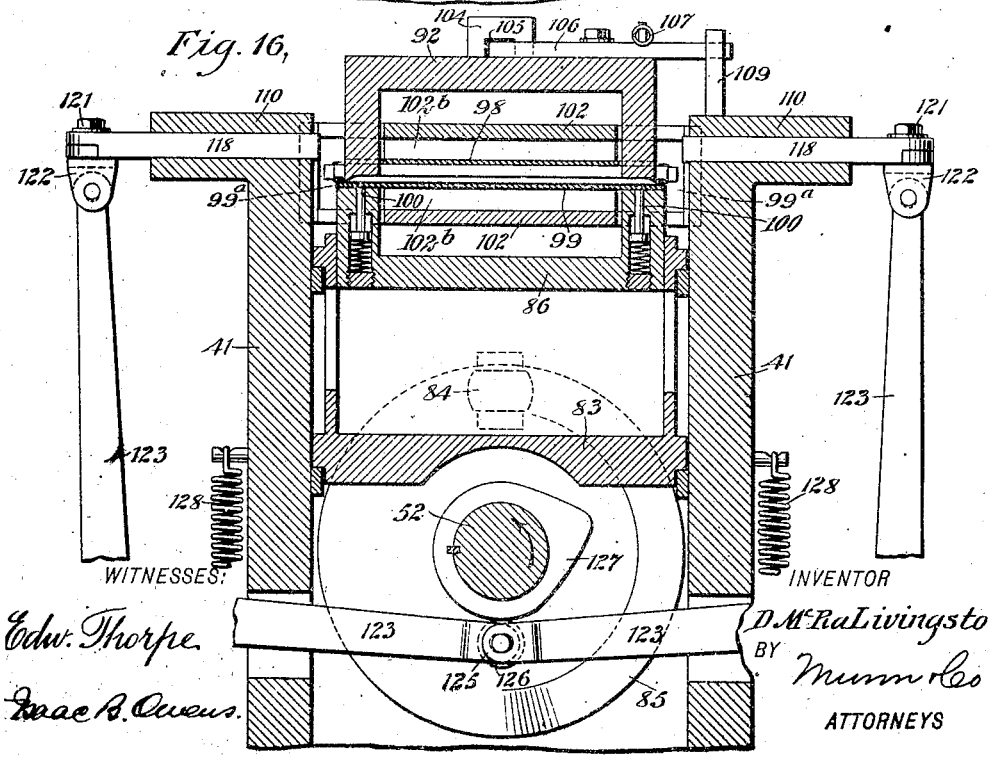

D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 11.
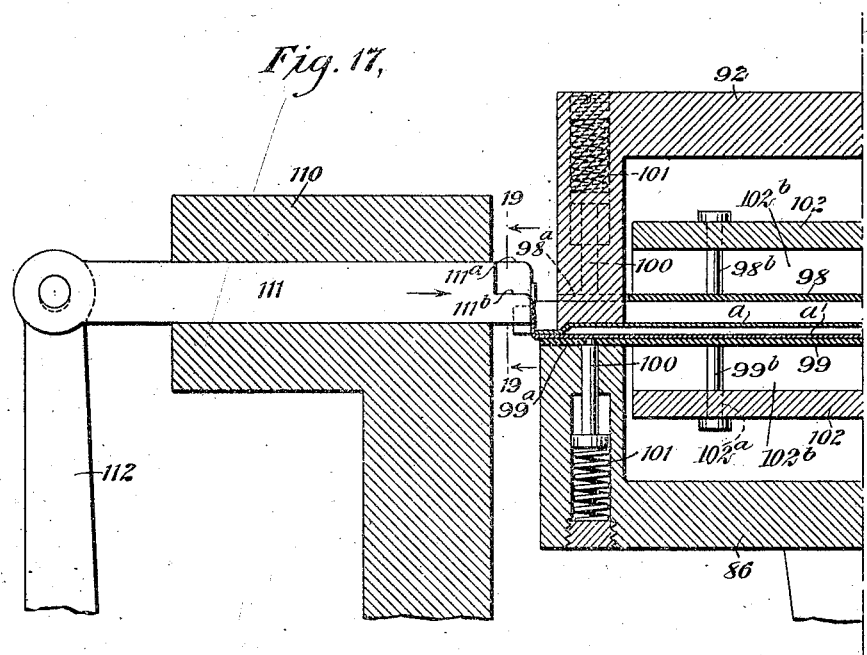
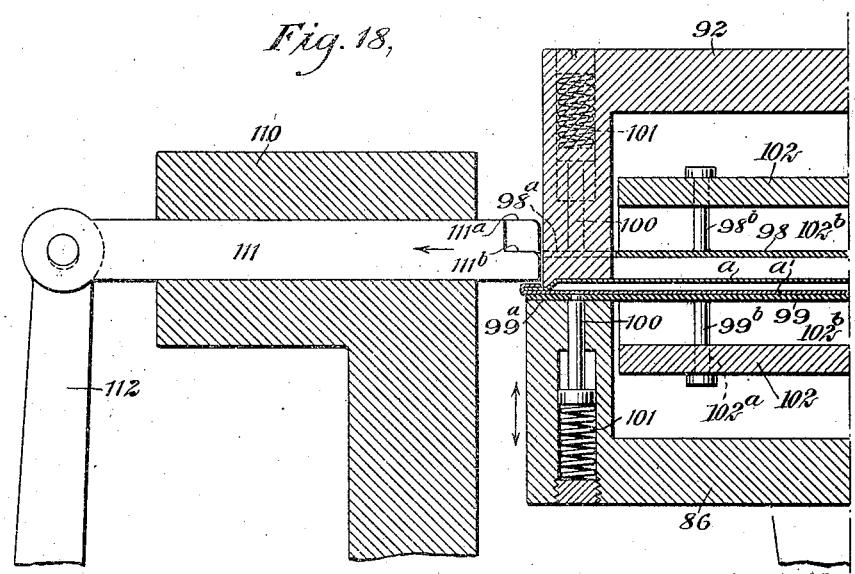
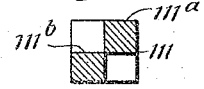
WITNESSES:
Edward Thorpe.
Isaac B. Owens.
INVENTOR
D McRa Livingston
BY Munn & Co
ATTORNEYS D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 12.
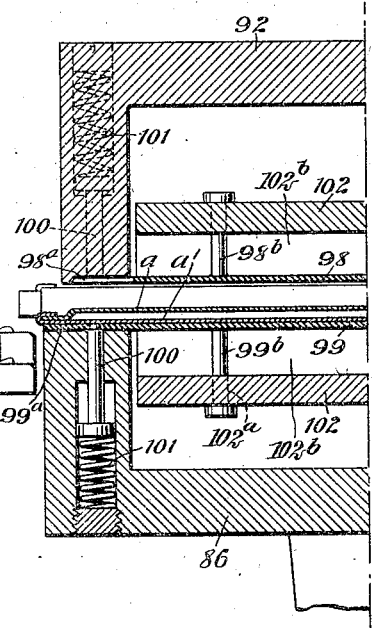
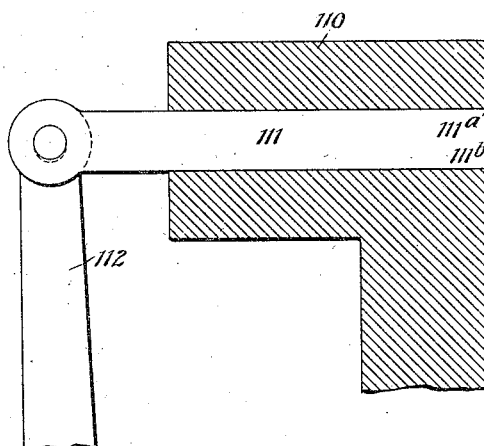
Fig. 20,
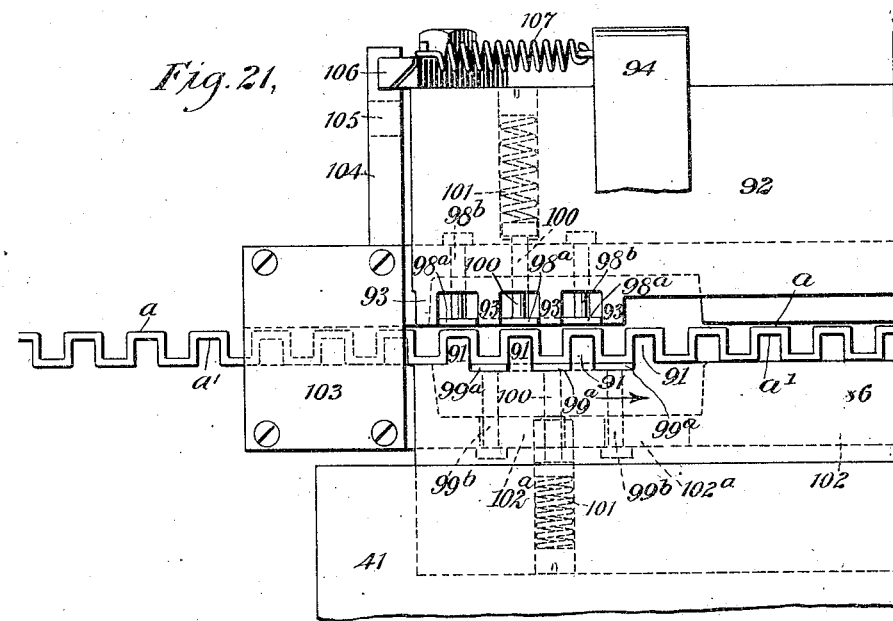
Fig. 21,
WITNESSES.
Edward Thorpe.
Isaac B. Owens.
INVENTOR
D. McRa Livingston
BY Munn & Co
ATTORNEYS D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 13.
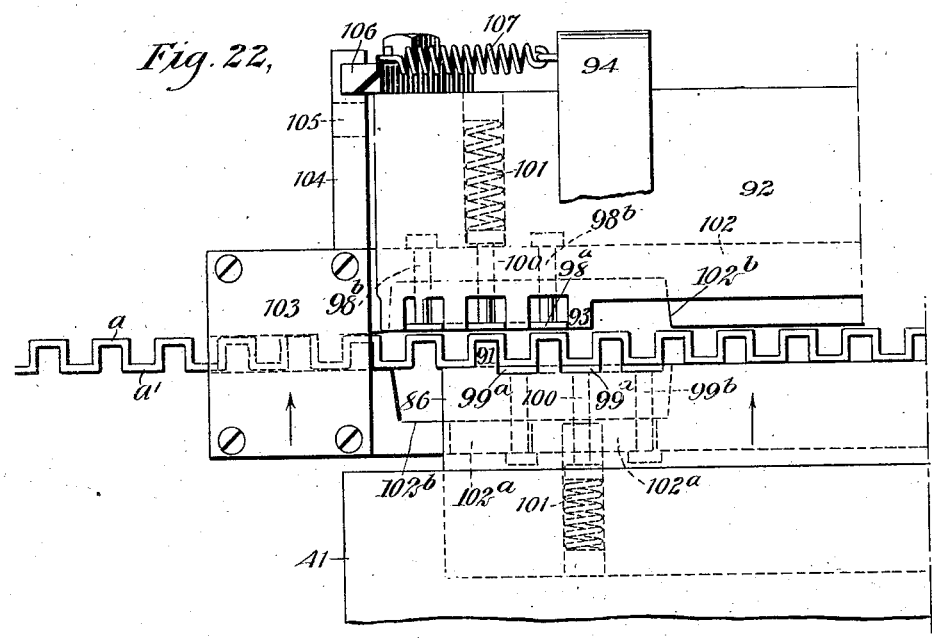
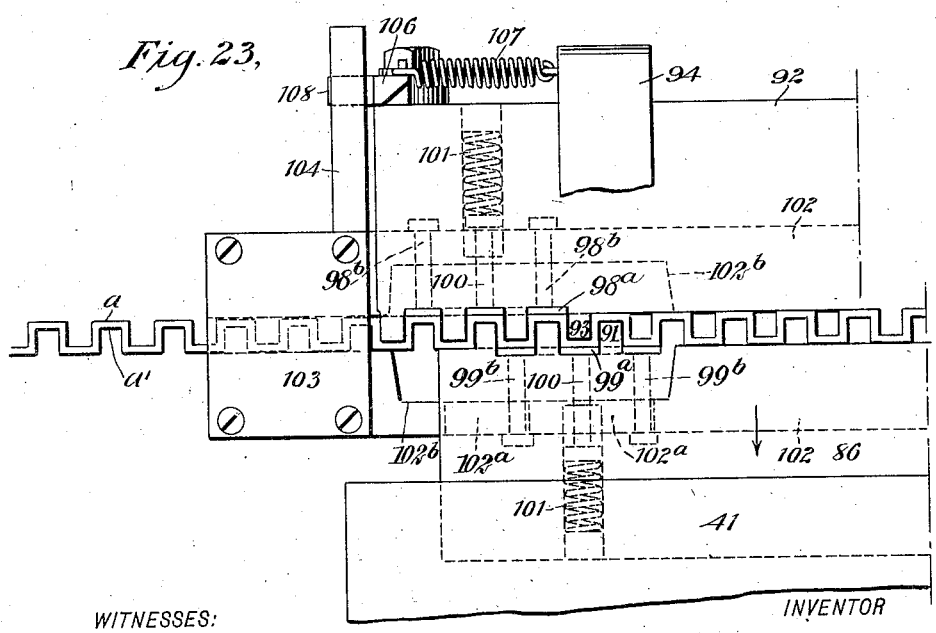
WITNESSES:
Edward Thorpe.
Isaac B. Owens.
INVENTOR
D. McRa Livingston
BY Munn & Co
ATTORNEYS D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 14.
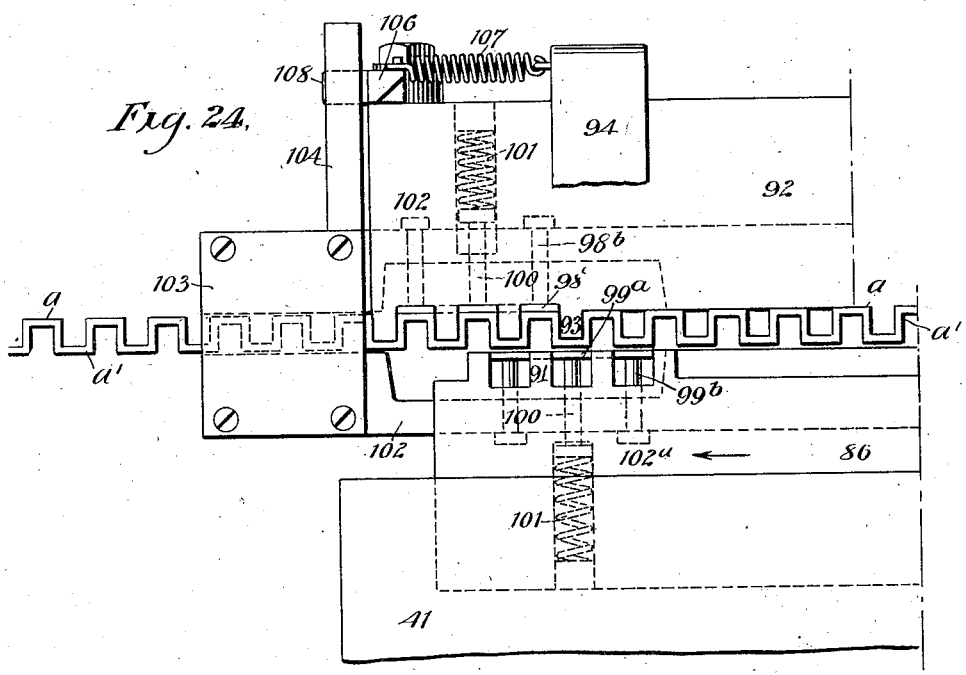
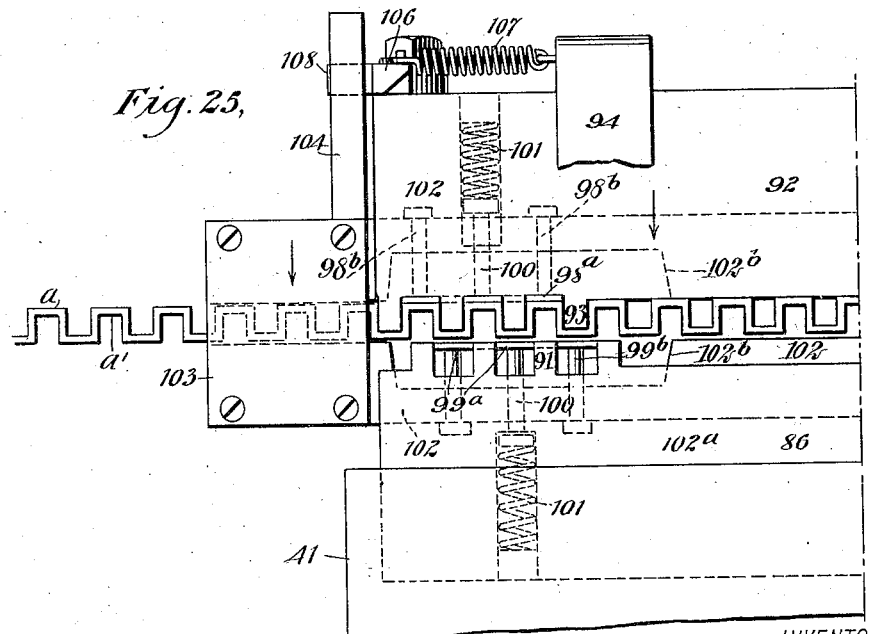
WITNESSES:
Edward Thorpe.
Isaac B Owens.
INVENTOR
D McRa Livingston
BY Munn & Co
ATTORNEYS D McR. LIVINGSTON.
MACHINE FOR MAKING COOLER OR RADIATOR SECTIONS.
APPLICATION FILED FEB. 23, 1906.
985,686.
Patented Feb. 28, 1911.
15 SHEETS—SHEET 15.
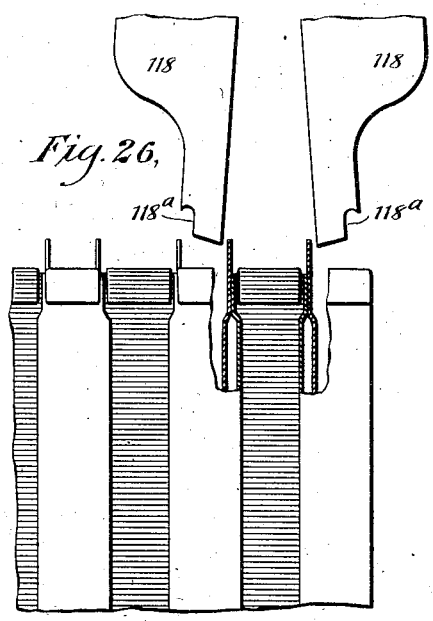
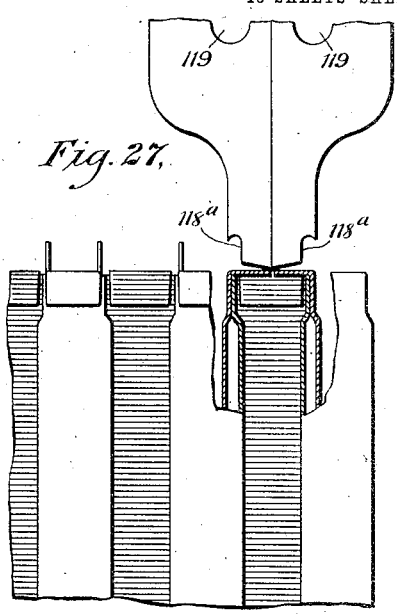
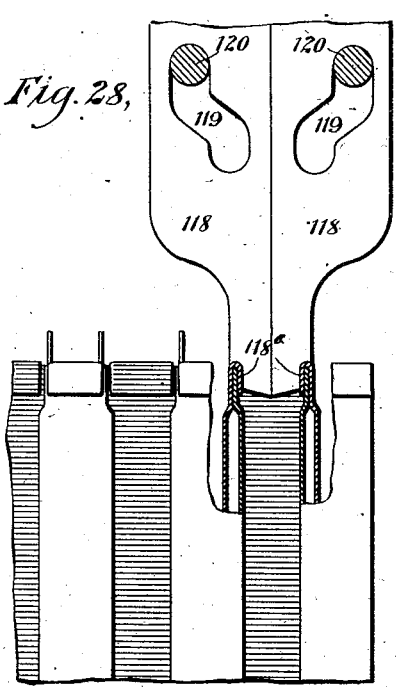
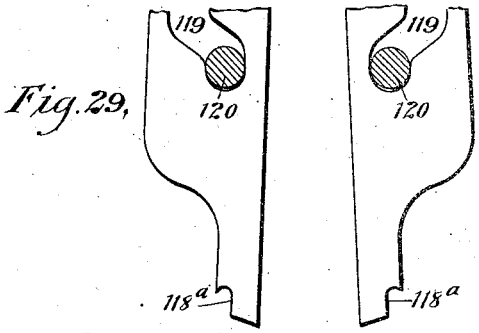
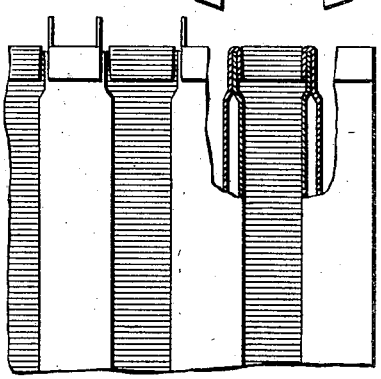
WITNESSES:
Edward Thorpe.
Isaac B. Owens.
INVENTOR
D. McRa Livingston
BY
Munn & Co
ATTORNEYS

UNITED STATES PATENT OFFICE.

D McRA LIVINGSTON, OF NEW YORK, N. Y.

MACHINE FOR MAKING COOLER OR RADIATOR SECTIONS.

985,686.     Specification of Letters Patent.     Patented Feb. 28, 1911.

Application filed February 23, 1906. Serial No. 302,512.

*To all whom it may concern:*

Be it known that I, D McRa Livingston, a citizen of the United States, and a resident of the city of New York, borough of Manhattan, in the county and State of New York, have invented a new and Improved Machine for Making Cooler or Radiator Sections, of which the following is a full, clear, and exact description.

Specifically my invention relates to an automobile machine for making the sections of coolers or condensers, particularly coolers for use in connection with automobile vehicles driven by water cooled internal combustion engines.

Notwithstanding this special adaptation my invention involves various principles which are useful in other arts, as will fully appear hereinafter.

The cooler forming the special product of my machine is formed, broadly stated, of sections each having two sheets of metal shaped and matched together in a peculiar manner to produce a thin, flat, tortuous tube through which the water to be cooled is circulated.

My present invention, therefore, resides in certain new and useful principles of structure and coacting element - organization through which I am enabled by a series of concurrent and inter-dependent operations separately to shape the two metal sheets or plates of which the section is formed, to assemble these sheets in their characteristic relation, and finally, to join together their side edges by a species of lock seam which insures a structure capable of resisting the strains it is in practice necessarily called upon to endure.

In practically embodying my invention I make use of a pair of jaws and two alternately acting dies for each sheet or plate of metal, the jaws serving a three-fold function, to wit, to feed the metal, to hold it, and to serve as anvils against which the dies act to give the metal corrugated form. From these shaping devices the metal plate is passed between assembling rolls which match or assemble the sheets, and, finally, the assembled sheets pass to the seaming devices. These devices embrace the jaws with essentially the three-fold function ascribed to the first named or shaper jaws, the seamer jaws coacting with the horizontal and vertical seamer fingers by means of which the projecting side edges of one sheet are folded or clenched over the corresponding side edges of the other sheet, thus finishing the operation.

The accompanying drawings illustrate as an example one manner in which the principles of my invention may be practically embodied, and I shall now in specific terms describe this practical embodiment.

Figure 2:
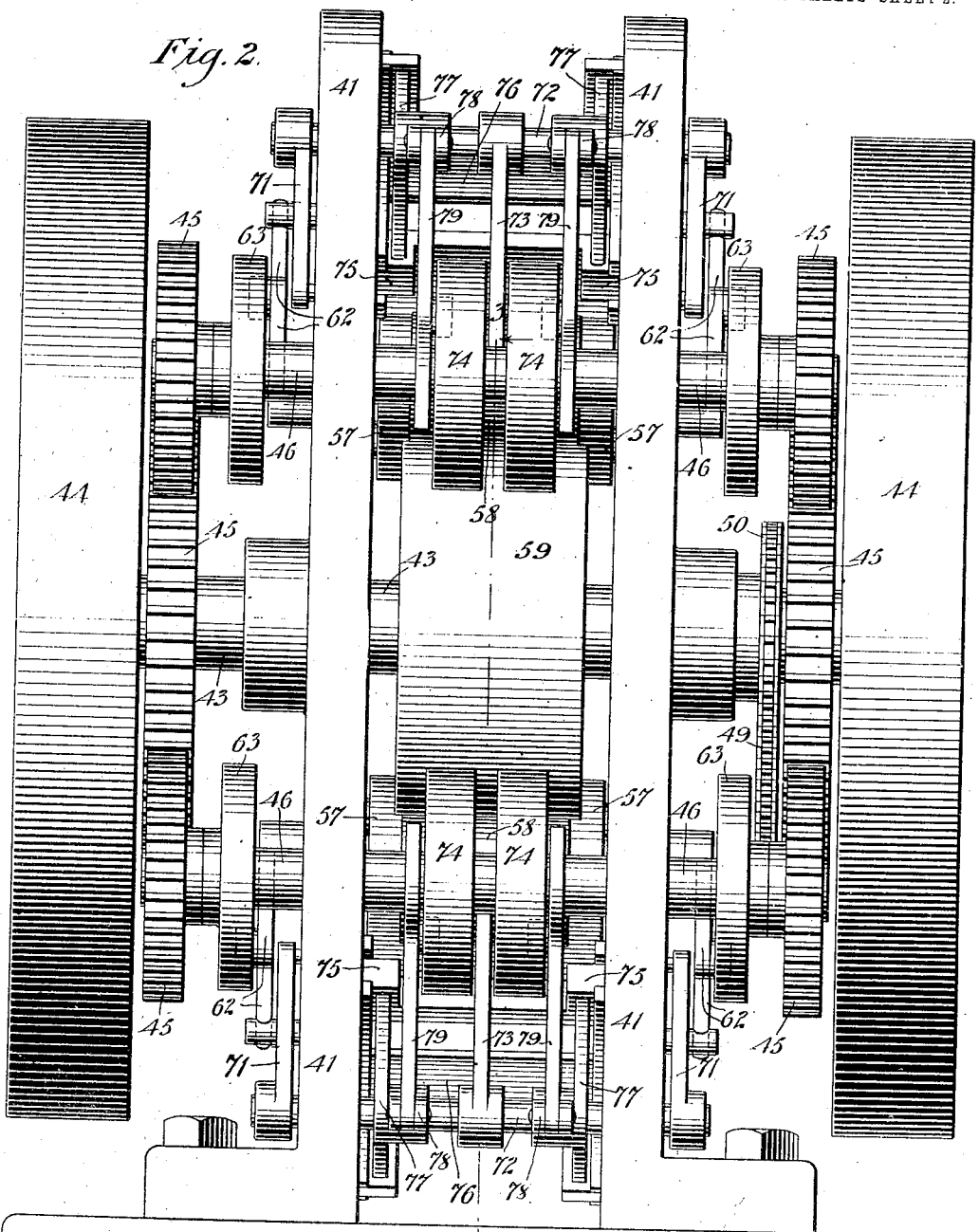
Figure 3:
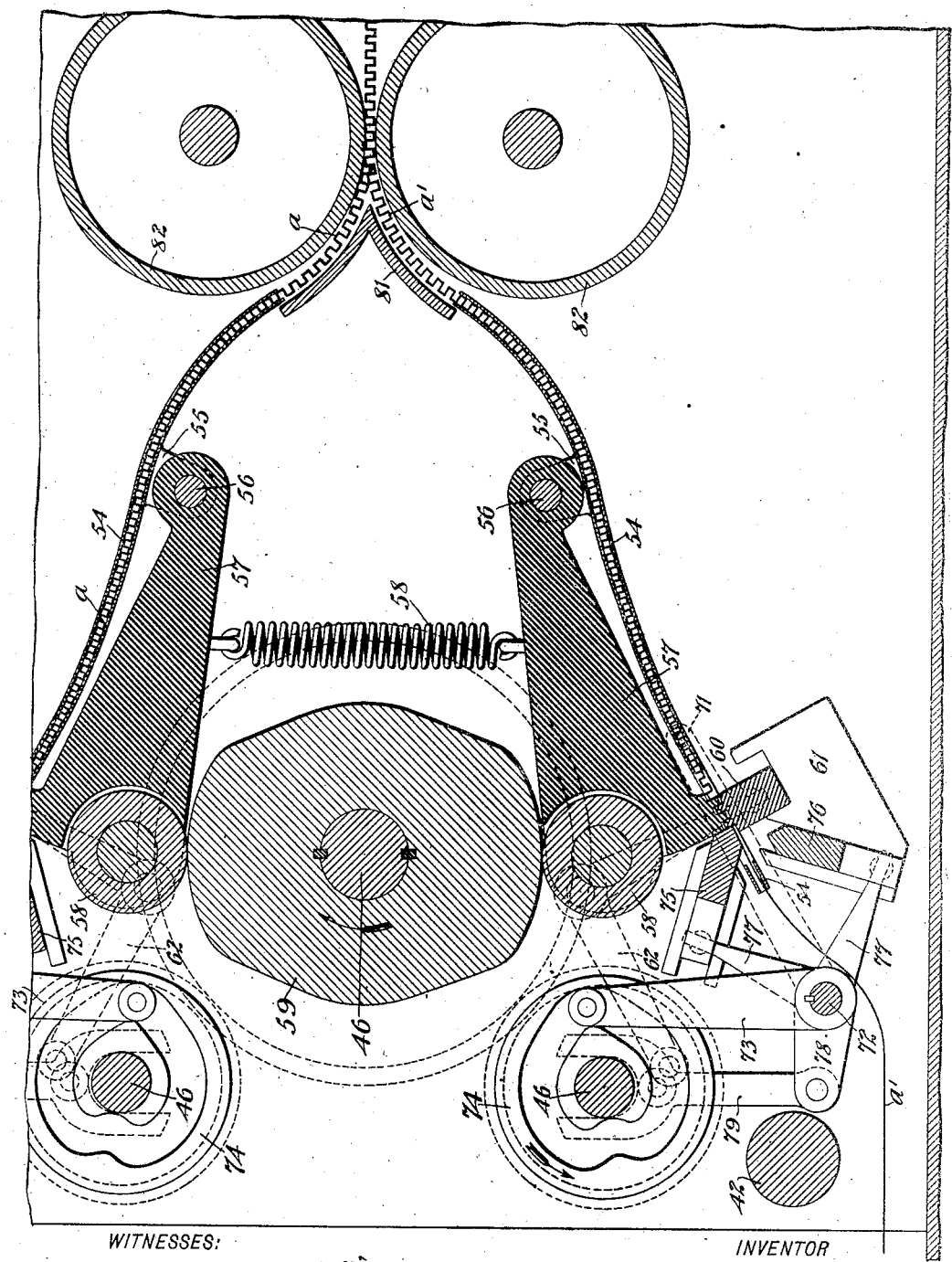
Figure 4:
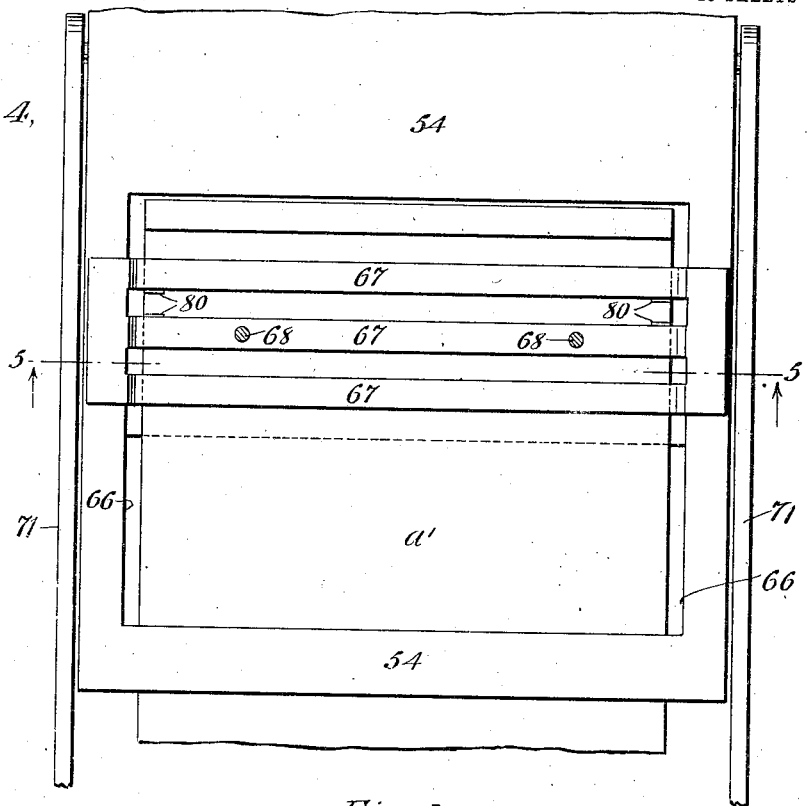
Figure 5:
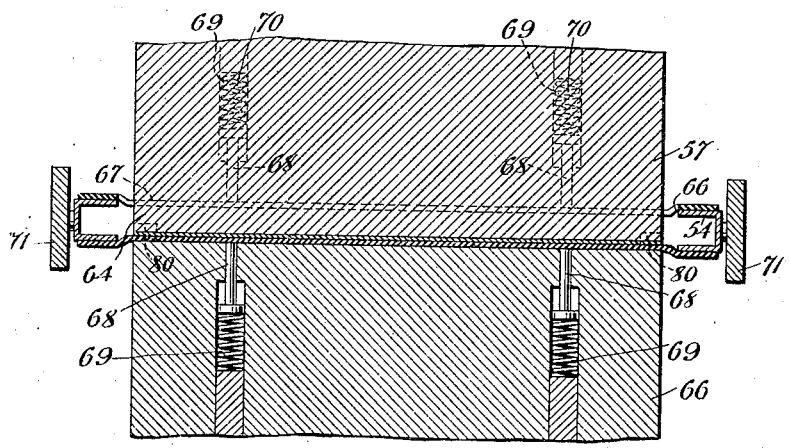
Figure 12:
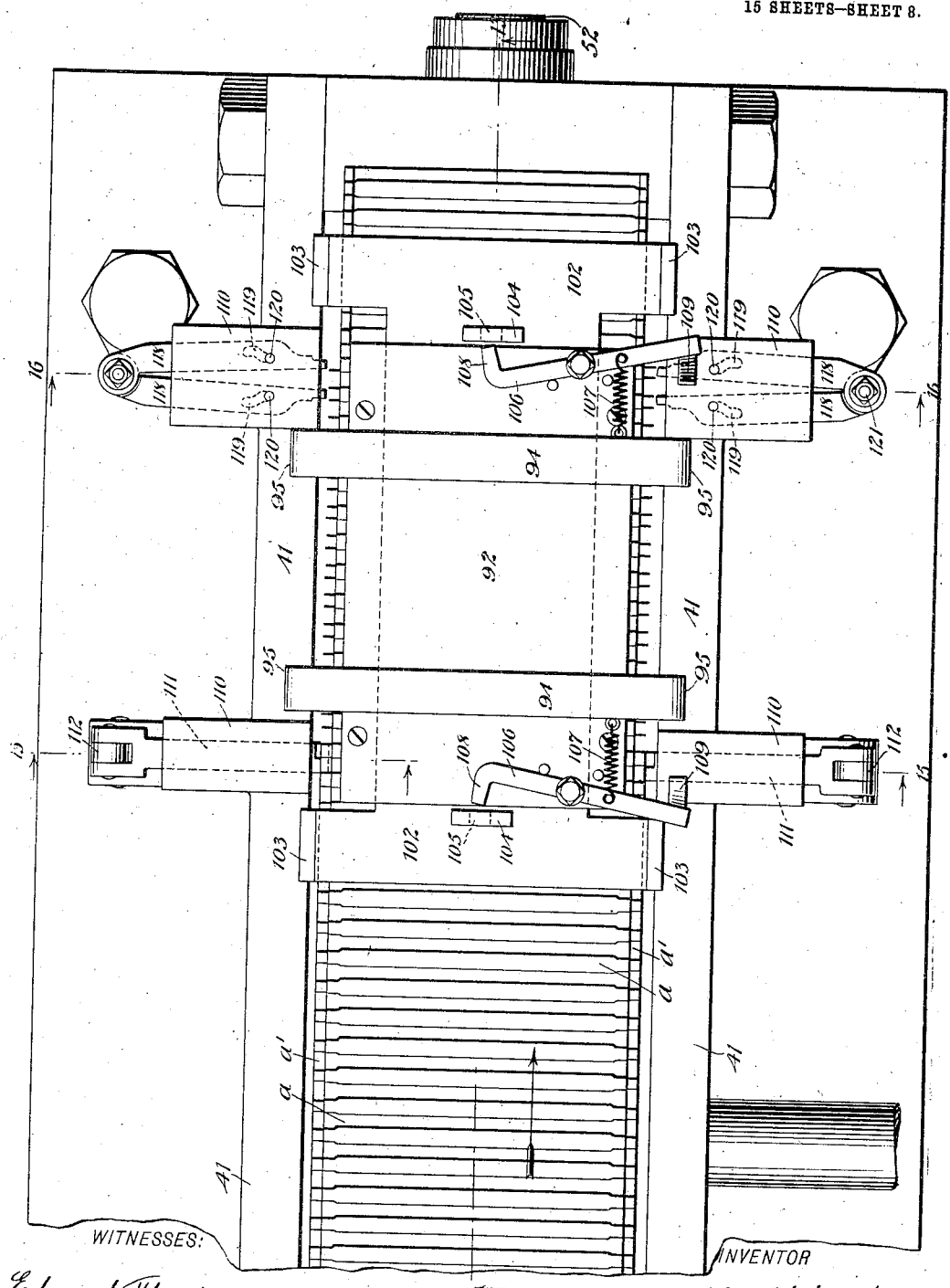

In said drawings Figure 1 is a side elevation of the machine; Fig. 2 is a front end elevation of the same; Fig. 3 is an enlarged section through the shaping devices on the line 3—3 of Fig. 2; Fig. 4 is a plan view of that part of one of the guides for the metal plate which is adjacent to the shaping jaws and dies, said view illustrating also the arm for shifting the position of the guides and one of the strippers which coact with the shaper jaws; Fig. 5 is a section on the line 5—5 of Fig. 4; Figs. 6, 7, 8 and 9 are fragmentary sections showing the shaper jaws and dies, the adjacent part of the metal guide and the strippers, and illustrating also the metal during the shaping operation, said views representing four successive periods in the operation of the parts illustrated; Fig. 10 is a diagrammatic view showing the shaper jaws, strippers and a part of the plate guide, and also illustrating the knives which are attached to the shaper jaws to slit the edges of one of the plates for the purpose of facilitating the seaming operation; Fig. 11 is a fragmentary perspective view of one of the plates when shaped, this view illustrating the slit side edges of the said plate which are subsequently to be bent over the corresponding edges of the mating plate; Fig. 12 is a plan view of the rear end of the machine illustrating the seaming mechanism; Fig. 13 is a longitudinal section of the rear end of the machine on the line 13—13 of Fig. 12; Fig. 14 is a reduced side elevation of the seaming devices; Fig. 15 is a cross section through the horizontal seaming fingers on the line 15—15 of Fig. 12; Fig. 16 is a cross section through the vertical seaming fingers on the line 16—16 of Fig. 12; Figs. 17, 18 and 20 are enlarged detail sections showing the operation of the horizontal seaming fingers, the seamer jaws and immediately coacting elements; Fig. 19 is a detail section of one of the horizontal seaming fingers on the line 19—19 of Fig. 17; Figs. 21, 22, 23, 24 and 25 are fragmentary side elevations illustrating the action of the seamer jaws in feeding the plate; Figs.

26, 27, 28 and 29 are fragmentary plan views showing the action of the vertical seamer fingers; Fig. 30 is a fragmentary perspective view showing the two shaped plates matched together, and illustrating the slit projecting edges of one plate in the position which they assume immediately prior to the seaming operation; Fig. 31 is a view similar to Fig. 30, except that it shows the formation of the horizontal seams, or in other words the longitudinal seams of the cooler section; Fig. 32 is a view the same as Fig. 31, except that it shows the completion of the vertical or transverse seams which finishes the formation of the cooler section; and Figs. 33, 34 and 35 are respectively transverse sections through the complete cooler section on the lines 33—33, 34—34 and 35—35 of Fig. 32, showing sections of the top, bottom and side bins of the cooler.

As shown best in Figs. 1 and 2, the machine is erected on a suitable base 40, and the frame comprises parallel side members 41 extending vertically and fastened to the base, and braced against each other by tie rods 42 which are shown in Fig. 1 but which to avoid confusion are omitted from Fig. 2. Mounted in the front end of the machine is a rotary prime mover shaft 43 fitted with a balance wheel 44 at each end outside of the frame sections 41. Said prime mover shaft is joined by gears 45 with the upper and lower shaper shafts 46 so as to drive the said shafts. In the rear part of the machine a stud shaft 47 is mounted (see Fig. 1) to which is fastened a sprocket 48 driven by a chain 49 from a sprocket 50 on the shaft 43. The stud shaft 47 is connected by a miter gearing, indicated by the broken lines 51 in Fig. 1, with a longitudinally extending shaft 52 centrally located in the frame and mounted in transverse walls 53 thereof. From this shaft 52 is taken the motion which operates the seaming devices, and owing to the positive gear connection between the shafts 43, 46 and 52 I insure maintaining correct synchronism of operation between the feeding elements of the shaper and seamer devices.

As shown best in Fig. 3 the metal sheets, which are indicated at $a$ and $a'$, pass in at the front end of the machine respectively at the upper and lower portions thereof, and run through flat tubular guides 54. Said guides have lugs 55 attached thereto, and these are mounted loosely on transverse shafts 56 so that the guides may have slight swinging movement around the shafts, as will fully appear hereinafter. The shaping mechanism is in two groups, one for the upper sheet $a$ and the other for the lower sheet $a'$. These groups are duplicates except as concerns the slitting knives which will be described hereinafter.

57 indicates the inner shaper jaws which are arranged to swing around the shafts 56 and carry rollers 58 engaged by a cam 59 secured to the shaft 46. The cam 49 is located between the inner jaws of the two groups of shaper devices, and the inner jaws of the two groups are connected by a retractile spring 58 which holds the rollers of the jaws engaged with the cam, and by means of this cam and spring the jaws 57 are given a back and forth movement around the center of the shafts 56 and toward and from the metal plates.

60 indicates the outer shaper jaws which are mounted in suitable guides or supports 61 and reciprocate periodically in a direction longitudinal of the line of movement of the metal plates by means of elbow levers 62 driven from cams 63 attached to the shaft 46, and suitably fulcrumed on the frame, as shown best in Figs. 4 to 9.

Each jaw 57 and 60 is formed with two teeth 64 which are spaced apart so that the teeth may inter-engage when the jaws are in the position shown in Figs. 7 and 9, and these jaws are also provided with anvil surfaces 65 which are at the front ends of the jaws. The guides 54 are each formed with an opening 66 therein into which opening the working faces of the jaws extend during the operation of the shaping devices. The metal plate is corrugated in rectangular bends, as shown in the drawings, particularly Figs. 3 and 6 to 9, and the teeth 64 are arranged to correspond to the corrugations so that the metal may be gripped firmly between the two jaws when they are engaged, as shown in Figs. 6 to 9. For the purpose of removing or stripping the metal from the jaws during certain periods of the operation, I provide each jaw with a stripper plate 67. Each of these plates, as shown best in Fig. 4, is provided with two transverse slots or openings which receive the teeth of the jaws so that the stripper plates may move relatively to the jaws from the position shown in Fig. 7 to the position shown in Fig. 6 with respect to the upper plate, and to the position shown in Fig. 8 with respect to the lower stripper plate. Said stripper plates have headed pins 68 attached thereto, and these pins operate in cavities 69 formed respectively in the jaws to limit the movement of the stripper plates.

70 indicates springs which press the pins 68 outward tending to move the strippers into their outer positions, as shown with respect to the upper plate in Fig. 6, and the lower plate in Fig. 8. Said stripper plates have their end edges respectively engaged with the upper and lower sides of the guides 54 so that lateral swinging of the guides as before explained will cause or permit one or the other of the stripper plates to move according to the direction of movement of the guide. The guides 54 are moved around their shafts 56 by means of arms 71 (see Figs. 3, 4 and 5), which arms are located at each side of the guide and pivotally connected thereto. The arms are fastened to shafts 72 which extend transversely in the frame, and have arms 73 attached thereto, the arms 73 being rocked by means of race cams 74 between which the arms 73 extend. In this manner as the arms 73 are rocked the shafts 72 are moved back and forth, and through the arms 71 the guides 54 are operated.

Each group of shaper devices is provided with two dies 75 and 76 (see Figs. 3, and 6 to 9). These dies are arranged to act alternately and along lines intersecting at right angles, the operation being such that the die 75 coacts with the anvil surface 65 of the jaw 60, as shown in Fig. 3, and the die 76 coacts with the anvil surface 65 of the dies 57, as indicated by the broken lines in Fig. 7. The jaws 75 and 76 are given their alternate movements by means of elbow levers 77 which rock loosely around the shaft 72 and have arms 78 to which forked links 79 are articulated. The forks at these links 79 straddle the shafts 46 and are operated by cam grooves in the outer walls of the cam disks 74, as indicated by the broken lines in Fig. 3.

In the operation of the shaper mechanism, corrugations are first started in the ends of the metal plates in any manner sufficient to enable the plate to fit between the intermeshing teeth 64 of the shaper jaws in the manner shown, for instance, in Figs. 7 and 9. Assuming this to have been done and that the jaw 57 has been moved inward, as shown in Fig. 6, it will be seen that the springs 70 will cause the stripper 67 of the jaw 57 to strip the metal from the teeth of said jaw while the guide 54 retains the corrugated plate in engagement with the teeth 64 of the jaw 60. The parts being in this position said jaw 60 will then be moved forward by its operating mechanism, as indicated by the arrow and broken lines in Fig. 6, the jaw 60 then taking the advanced position shown in Fig. 7. After this is accomplished the jaw 57 returns in engagement with the jaw 60, bringing its teeth 64 down between the teeth of the jaw 60, and clamping the corrugated metal between the two jaws. The said forward movement of the jaw 60 will result in advancing the metal the width of one corrugation, and the metal will then project straight from the first tooth 64 of the jaw 57, in juxtaposition to the anvil surface 65 of said jaw. When the parts assume this position the die 76 will then move forward, as indicated by the broken lines in Fig. 7, thus folding the metal against the anvil surface of the jaw 57 and forming a double bend in the metal. When this has been effected the die 76 returns and the jaw 57 and (this time) the guide 54 move away from the jaw 60 to the position shown in Fig. 8. The stripper plate 67 of the jaw 60 now follows the guide 54 with the result that the corrugated plate is entirely disengaged from the jaw 60 and held in engagement with the retracted jaw 57 by the guide 54. When this takes place the rearwardly advanced jaw 60 now returns to the former position, as indicated by the arrow and broken lines in Fig. 8, and when this is accomplished the jaw 57 and the guide 54 again return to their active positions, as shown in Fig. 9. This leaves the metal plate extending from the front tooth 64 of the jaw 60 and bridging the anvil surface 65 of said jaw. The die 75 now moves, as shown by the arrow and the broken lines in Fig. 9, and forms a second double bend in the plate, as the dotted lines in said view illustrate. Fig. 3 shows the die in the course of this operation. From the position shown in Fig. 3 the die 75 returns to its inactive position and then the jaw 57 is retracted and the jaw 60 moved rearward repeating the operation, the beginning of which is illustrated in Fig. 6. It will thus appear that each time that the jaw 60 moves rearward it carries with it the metal plate, feeding the same for a distance equal to the movement of the jaw, the plate being then disengaged from the jaw to allow the jaw to return and recover its engagement with the plate. Also each time that the jaw 60 moves to its rearward position the die 76 operates, as in Fig. 7, and each time that the jaw moves to its rearward position the die 75 operates as in Fig. 9, the shaper mechanism, therefore, advancing the plate with a step-by-step movement and forming two double bends therein for each advanced movement of the plate. During these operations the stripper plates act to disengage the metal alternately from the jaws, while the guide acts to control the action of the stripper plates and also to hold the metal engaged with one or the other of the jaws according to the period of the operation. In connection with the formation of the corrugations in the metal it is important to observe that the metal is shaped by bending or folding, as contradistinguished from drawing, the former operation producing accurate results and avoiding stretching and weakening the metal.

Fig. 11 shows the lower plate a' after it has passed through the shaping devices. Fig. 30 shows the two plates after being passed through the shaping devices and matched together. It will be seen that in addition to the corrugations the plates are formed with off-set portions or shoulders indicated at b. These shoulders or off-sets are formed by suitable surfaces on the jaws or dies simultaneously with the formation of the corrugations. Also to enable the side edges of the plates to be seamed together, the edges of the lower plate *a* are slit at each bend, as indicated at *b'*. This is effected by means of small knives or blades 80 which are attached to the teeth 64 of the lower jaws 57 and 60 and each time said jaws are engaged, as shown in Fig. 10, the blades 80 strike through the plate *a'* forming the slit *b'* as described. Since it is only necessary to slit the edges of the lower plate *a'* the lower shaping devices only are provided with the knives or blades 80.

The two groups of shaping mechanism operate synchronously so that the metal plates are corrugated and advanced toward the rear end of the machine at the same rate of speed, the rear ends of the guides 54 delivering the corrugated plate between a branching guide 81 and rollers 82 (best shown in Fig. 3). The corrugated plate is by means of said guide 81 and rollers 82 matched together in the relative position illustrated in Fig. 30, the relative sizes of the corrugations of the two plates being gaged so that the plates will fit together, as shown, and the edge portions of the plates by means of the shoulders *b* before described being caused to contact with each other to facilitate forming the seam, as will be hereinafter described. The middle portions of the plates are spaced or separated from each other by the shoulders *b*, as shown in the sectional portions of Figs. 30 to 33, thus forming the flat tortuous tube referred to. From the matching or assembling rolls 82 the corrugated sheets pass rearward to the seaming devices which will now be described.

By referring particularly to Figs. 12 to 16, it will be seen that in the rear end of the machine between the side frames 41 a carriage 83 is mounted to reciprocate horizontally longitudinally of the machine, this carriage having at its ends rollers 84 which engage cams 85 fastened to the shaft 52, and by means of which cams the carriage is given its characteristic movement. The carriage 83 mounts the lower seamer jaw 86 which is connected with the carriage at its ends by means of guide devices 87, shown best in Fig. 13, the carriage moving the jaw longitudinally of the machine and the jaw being capable of independent vertical movement on the carriage. This vertical movement is effected by a cam 88 fastened to the shaft 52, and acting against a roller 89 carried by a depending lug 90 on the lower seamer jaw. Said jaw, as shown in Figs. 15 and 16, is U-shaped, and its upper side edges, as shown best in Fig. 14, are each provided with two groups of regularly spaced teeth 91 corresponding in form to the corrugations in the plates *a* and *a'*. The upper seamer jaw 92 is in cross section in the form of an inverted U so that its lower side edges meet the upper side edges of the lower jaw (see Figs. 15 and 16). The lower side edges of the jaw 92 are each provided with two groups of regularly spaced teeth 93 corresponding to the corrugations of the plates *a* and *a'*, and adapted to interlock with the corresponding groups of teeth 91, as shown in Figs. 21-25. The upper jaw 92 is attached to and carried by yokes 94 which are preferably two in number, and are arranged to slide vertically in guide ways or grooves 95 formed in the side frames 41. Said yokes 94 have at their under sides rollers 96 and these are engaged with cams 97 fastened to the shaft 52. Said cams serve to impart periodic vertical movement to the parts 94 and 92. It, therefore, will appear that the upper seaming jaw is mounted to move vertically toward and from the lower jaw, and that its mounting and actuating devices are independent of those of the lower jaw excepting that both are actuated from the shaft 52. It will also be seen, particularly with reference to Figs. 15, 16, 17, 18 and 20 that the side edges of the lower seamer jaw project out beyond the outer face of the sides of the upper seamer jaw, forming ledges exposed by the upper jaw, which ledges are used in the seaming operation as will be hereinafter set forth.

Coacting with each of the seamer jaws are two stripper plates 98 and 99, which perform essentially the function of the strippers 67 before described. The stripper plates 98 and 99 lie between the seamer jaws 86 and 92 and are formed with toothed side edges 98ª and 99ª (see full lines in Figs. 20-25, and the broken lines in Figs. 15 and 16). These teeth 98ª and 99ª match with the teeth 91 and 93 and set between the same, as shown. It follows, therefore, that the stripper plates are arranged in two pairs, the members of each of which face each other and are engaged respectively with the upper and lower jaws. Attached to one tooth at each end of each stripper plate, as shown by the broken lines in Figs. 13, 15 and 17, and the full lines in Fig. 20, are pins 100 which slide freely in the side walls of the seamer jaws 89 and 92, and are pressed inward by springs 101. These devices tend to move the strippers 98 and 99 outward from their corresponding jaws, as shown with respect to the stripper 98 in Fig. 21, and 99 in Fig. 24. The action of the strippers is controlled, however, by the seamer guide which comprises top and bottom walls 102 extending freely through the space between the side walls of the upper and lower seamer jaws and projecting beyond each end of said jaws, the projecting ends of the upper and lower walls 102 being joined by cheek plates 103 (see Figs. 13 and 24) thus forming of the elements 102 and 103 a rigid box-like structure which is movable independently of the seamer jaws, and through which the corrugated plates pass snugly so that vertical movement of the guide will correspondingly move the plates $a$ and $a'$.

As shown best in Fig. 13, the parts 102 of the seamer guide have cavities $102^b$ formed therein to accommodate the strippers 98 and 99, the other portions of the inner surfaces of the said parts 102 being plane to engage the plates $a$ and $a'$ as described. The seamer guide is joined to the upper strippers 98 by means of headed pins $98^b$ which are fastened to the strippers 98 and extend loosely through the upper plate 102 of the seamer guide, and said guide is joined to the lower stripper 99 by means of pins $99^b$ which extend loosely through slots $102^a$ in the lower plate 102 of the seamer guide, the slots $102^a$ running longitudinally of the guide so that the guide and the strippers 98 and 99 may move vertically relatively to the jaws 92 and 86, while the lower jaw 86 with the stripper 99 owing to the slots $102^a$ is capable of moving longitudinally relatively to the seamer guide and jaw 92. Said box-like structure forming the seamer guide is provided at each end with upwardly projecting lugs 104 having keeper orifices therein. With the orificed lugs 104 latches 106 coact. These latches are best shown in Fig. 12 and are pivotally mounted on the upper seamer jaw 92 in a horizontal position. Springs 107 have connection with the latches, which springs tend to engage the bent ends 108 with the walls of the orifices 105 when the seamer guide is in the relatively raised position shown in Figs. 13 and 24. The latches 106 moving vertically with the upper jaw 92 have their ends opposite the bent ends 108 designed to coact with cam fingers 109. These cam fingers as shown best in Figs. 12 and 14 are mounted on the right-hand side of the framing of the machine, preferably through the medium of boxes 110 at said side of the machine in which operate the seaming fingers, as will be hereinafter fully set forth. Said latches, therefore, are normally engaged with the keeper lugs 104, but when the seamer guide drops to the position shown, for example, in Figs. 14 and 22 the latches engage the cam fingers 109 and are thrown into inactive position. By means of these latches the seamer guide is locked with the upper jaw 92 during certain periods of the operation, and when the latches are inactive the guide with the connected strippers and the plates $a$ and $a'$ are dropped below their first position to that shown in Figs. 21 and 22. In the first position the guide holds the upper strippers 98 engaged between the teeth 93 of the upper jaw, and the strippers 99 move outward to the ends of the teeth 91 of the seamer jaw 86, and in the second position the order is reversed, the strippers 98 being moved outward to the ends of the teeth 93 and the strippers 99 being moved inward between the teeth of the jaw 86. The springs 101 and pins 100, therefore, press the strippers yieldingly toward each other, while the seamer guide controls the movement of the stripper relatively to the seamer jaws. It will thus appear that the seamer guide and seamer strippers perform essentially the functions of the shaper guides and strippers, and by essentially the same operations.

The horizontal or longitudinal seamer fingers 111 are arranged one at each side of the machine and move transversely in the forward pair of boxes 110 (see Figs. 12, 17, 18 and 20). These fingers 111 are located respectively at the ends of the front pair of strippers 98 and 99. Reference to Fig. 30 will show that the horizontal or longitudinal parts of the lower plate $a'$ which are bent over the plate $a$ to form the seams shown in Fig. 31, lie in two planes, and to accommodate this the working ends of the seamer fingers 111 are formed with two working surfaces $111^a$ and $111^b$ arranged at different elevations corresponding respectively to the elevations of the said two parts of the plate $a'$, so that as the seamer jaws move vertically they will then simultaneously engage two adjacent horizontal or longitudinal bends of the plate $a'$ with the seamer finger at each side of the machine. Said seamer fingers are arranged to reciprocate horizontally in the boxes 110, and this is effected as shown best in Fig. 15 by means of elbow levers 112 fulcrumed on brackets 113 projecting from the side frames 41, a horizontal arm of the elbow levers 112 extending through openings in the side frames and being joined together by a pin 114 which also carries a roller 115 engaged by a cam 116 on the shaft 52.

117 indicates springs which throw the elbow levers against the cam and by this means a regular periodic in and out movement is imparted to the seamer fingers 111.

The vertical seamer fingers 118 seam the vertical bends of the radiator section which bends are shown in Fig. 31 in the position they assume prior to the seamer operation. These fingers 118 are arranged in pairs, one pair at each side of the machine, and are mounted in the rear boxes 110 respectively opposite the ends of the rear pair of strippers 98 and 99. The vertical or transverse seamer fingers 118 are movable both longitudinally and laterally in the rear boxes 110, and, as shown best in Figs. 12 and 28, these fingers are provided with angular slots 119 receiving pins 120 held stationary in the boxes 110, so that as the fingers are reciprocated longitudinally of themselves and transversely of the machine, the walls of the slots 119 running on the pins 120 will cause the fingers to move toward and from each other enabling them to set on the vertical or transverse seams of the cooler sections as will fully appear hereinafter. As shown in Figs. 12 and 16 the fingers 118 are pivoted together at their outer ends by pins 121, these in turn being carried by yokes 122. Pivoted to the yokes 122 are elbow levers 123 fulcrumed on suitable brackets 124 attached to the side frames (see Fig. 1) and extending inward to the shaft 52, where the meeting arms of the elbow levers are joined by a pin 125, this pin also mounting the roller 126 which is acted on by a cam 127 fastened to the shaft 52. 128 indicates springs engaged with the elbow levers 123 and serving the same function as the springs 117 before described. By these devices the vertical or transverse seamer fingers are given regular reciprocal movement toward and from the edges of the metal plates, as they pass through the seamer devices. Said fingers owing to this movement and to the transverse movement toward and from each other occasioned by the pins 120 and the walls of the slots 119, engage the edges of the metal plates at the transverse bends thereof, and fold the edges of the plate $a'$ over the corresponding edges of the plate $a$, causing the cooler section to take the finished form shown in Fig. 32, all of which will be fully set forth hereinafter.

In the operation of the seamer devices, the seamer jaws have the before described relative movements for the double purpose of feeding the plate and for presenting it to the two sets of seamer fingers. Figs. 21 to 25 illustrate the relative movements of the seamer jaws in feeding the plate, which movements are brought about by the various cams on the shaft 52. Fig. 21 illustrates the upper jaw 92 raised to disengage its teeth 93 from the teeth 91 of the lower jaw 86, and also illustrates the seamer guide released from the latches 106 and resting so that the stripper 99 lies with its teeth $99^a$ engaged between the teeth 91 of the jaw 86, while the stripper 98 is in outward position pushing the plate out of engagement with the teeth 93, the seamer guide holding the plates engaged with the teeth 91. At this instant the jaw 86 actuated by the cams 85 moves rightward, as indicated by the arrow in Fig. 21, assuming next the position which is shown in Fig. 22 and carrying with it the plates $a$ and $a'$, thus advancing the same for the distance of two of the bends therein. The next movement in the operation is the rise of the jaw 86 as indicated by the arrow in Fig. 22, and through the stripper plate 99 and pins $99^b$ the seamer guide, and hence the plates and upper stripper 98, are raised also, the parts next assuming the position shown in Fig. 23 in which the latches 106 automatically engage with the keeper lugs 104 and lock the strippers and seamer guide with the jaw 92, thus holding the plates $a$ and $a'$ raised into engagement with the teeth 93 of the jaw 92. When this movement is accomplished the jaw 86 again descends, as indicated by the arrow in Fig. 23, and after reaching the position shown in Fig. 24 returns toward the forward end of the machine, as indicated by the arrow in said view, reaching the position shown in Fig. 25 which corresponds with the position from which it has moved (see Fig. 21). The jaw 92, the strippers and seamer guide, together with the plates $a$ and $a'$ now descend, as indicated by the arrows in Fig. 25, again engaging the jaws together, with the plates between them. This movement also results in the engagement of the latches 106 with the cam fingers 109, and in the release of the latches from the keeper lugs 104 as before explained. These movements complete, it will be seen, the steps necessary to the feeding of the metal plates, the jaw 86 moving back and forth longitudinally of the machine to carry the plates ahead, the strippers disconnecting the plates from the jaws according to the period of the operation, and the jaw 92 and the seamer guide coacting, first, to hold the plates in engagement with the jaw 86 when moving rearward, and, second, in their advanced position during the return movement of the jaw 86 to recover its engagement with the plates. In regard to the strippers 98 and 99, it is pointed out that these are employed to render absolutely certain the operation of the seamer devices in that they avoid the possibility of the slit edges of the plates catching in the teeth of the jaws 86 and 92. Said strippers may, however, be omitted and the seamer guide caused not only to hold the plates in their various positions, but also to disengage them from the jaws. These functions of the seamer devices are in addition to the functions of the jaws in connection with the actual seaming operation, which will now be described.

As the jaw 92 and seamer carrier drop into reëngagement with the jaw 86, the beginning of which operation is illustrated in Fig. 26, said jaws come together firmly clamping the plates and strippers between them, assuming the position shown in Fig. 15 from which position the two seamer jaws, stripper and seamer guide continue their descent as a unit. Immediately before this movement, which is illustrated in Fig. 17, the horizontal or longitudinal seamer fingers 111 will assume the position shown in said view. Referring now to Fig. 30, it will be seen that the slit side edges of the plate $a'$ project beyond the side edges of the plate $a$, and upon the above described downward movement of the jaws 86 and 92 the projecting edges of the plate $a'$ at two contiguous horizontal or longitudinal bends thereof engage the surfaces $111^a$ and $111^b$ of the fingers 111, and said projecting edges are thus bent up into position at right angles to the plane of the plates, as shown in Fig. 17. When this is accomplished the fingers 111 move in, as indicated by the arrow in Fig. 17, assuming the position shown in Fig. 18, which results in bending over the formerly projecting edges of the plate $a'$ until they lap around or embrace the corresponding edges of the plate $a$, forming a secure lock seam. At this time a step $88^a$ on the cam 88 (see Figs. 13 and 15) engages the roller 89 and imparts to the jaw 86 a quick, short, upward movement which presses the seam thus formed against the under sides of the fingers 111 and effectually clenches the same. The seaming fingers 111 are then withdrawn, as indicated at the arrow in Fig. 18, and the jaws 86 and 92 then repeat the movements before described by means of which the metal plate is fed forward for a distance equal to the two bends which have just been seamed by the fingers 111. The condition of the cooler section at this period of the operation is that shown in Fig. 31.

Concurrent with these operations and at a time when the plates are momentarily at rest the vertical or transverse seamer fingers 118 operate to bend over and clench the projecting edges of the transverse bends of the plate $a'$. These operations are illustrated in Figs. 26 to 29. Referring to Fig. 26, as the fingers 118 are moved inward the pins 120 and the walls of the slots 119 cause said fingers to be simultaneously engaged together, as shown in Fig. 27. The fingers in so moving together engage the edges of two of the transverse bends of the plate $a'$ between them and turn the same from the position shown in Fig. 26 to the half folded position shown in Fig. 28. When this is accomplished the continuing inward movement of the vertical seamer fingers from the position shown in Fig. 27 to that shown in Fig. 28 causes the edges of the plate $a'$ to be turned completely inward forming the same, as shown in Fig. 28. The fingers 118 have notches $118^a$ to accommodate the seams thus formed, and the inclined surfaces produced by said notches act on the seams to tighten or clench the same during the final inward movement of the fingers. The fingers 118 are then withdrawn to the position shown in Fig. 29, and in so doing they are caused again to spread apart from each other in position to begin a second operation. This operation of the transverse or vertical seamer fingers transforms the cooler section from the form shown in Fig. 31 to that shown in Fig. 32 and finishes the operation, the finished cooler section being passed from the rear end of the machine by the progressive feeding movement of the seamer jaws. In addition to the notches $118^a$ serving to clench the transverse seams I cause the slots 119 to be so formed as to impart to the fingers 118 a slight spreading movement at the instant before the withdrawal of the fingers from the position shown in Fig. 28, the fingers then acting against the sides of the teeth of the jaw 86 effectually to clench the transverse seams. Indeed, this operation may be made so complete as to permit of dispensing with the slots $118^a$ in so far as they constitute a clenching means.

The organized operation of the machine may, therefore, be traced as follows: The individual plates $a$ and $a'$ are fed into the machine at the front end thereof, and in passing through the shaping devices are corrugated or shaped so that they will match together in the relation shown in Figs. 33, 34 and 35. The edges of the plate $a'$ are slit by the knives 80, and the two plates are progressively and synchronously fed forward to the assembling devices 81 and 82 which accurately match together the shaped plates in the relative position which they assume in the finished cooler section. From this point the assembled plates $a$ and $a'$ pass on to the seaming devices by the combined and synchronous operation of the feeding members of the shaping and seaming groups. In the seaming mechanism by operations interwoven with the feeding operations of the seaming jaws, the longitudinal and transverse seamer fingers act on the slit projecting edges of the plate $a'$ turning over said edges to form the seams and clenching the same tightly together, the finished product passing out from the rear end of the machine and requiring only the application of solder or other equivalent substance to the seams thus formed to produce a water-tight cooler section.

Having thus described the practical embodiment of my invention, what I claim as new and desire to secure by Letters Patent is:

1. In a machine for forming cooler sections of two sheets or plates of metal, the combination of means for separately shaping the plates, means for assembling the plates in their characteristic relation, means for fastening together the side edges of the plates, and gearing for operating the fastening and shaping means in unison.

2. In a machine for forming cooler sections of two sheets or plates of metal, the combination of means for separately shaping the plates with transverse corrugations permitting said plates to be matched together to form a flat tortuous tube, means for matching the plates in said relation, means for fastening together the side edges of the plates, and gearing for operating the shaping and fastening means in unison.

3. In a machine for forming cooler sections of two sheets or plates of metal, the combination of means for separately shaping said plates with transverse corrugations, and with off-set portions adjacent to their edges, permitting said plates to be matched together to form a flat tortuous tube, means for so matching the plates together, means for fastening together the side edges of the plates, and gearing for operating the shaping and fastening means in unison.

4. In a machine for forming cooler sections of two sheets or plates of metal, the combination of means for separately shaping the plates with transverse corrugations, enabling said plates to be matched together to form a flat tortuous tube, and for slitting the side edges of one of the plates, means for so matching the plates together, means for seaming the slit edges of the one plate over the adjacent edges of the other plate, and gearing for operating the shaping and seaming means in unison.

5. In a machine for forming cooler sections of two sheets or plates of metal, the combination of means for shaping said plates with transverse corrugations enabling them to be matched together to form a flat tortuous tube, means for so matching the plates together, means for seaming together the side edges of the plates, and gearing for operating the shaping and seaming means in unison.

6. In a machine for forming cooler sections of two sheets or plates of metal, the combination of means for shaping the plates with transverse corrugations enabling them to be matched together to form a flat tortuous tube, and for slitting the side edges of one of the plates, means for so matching the plates together, means for bending the slit edges of the one plate over the corresponding edges of the other plate to form a seam, and gearing for operating the shaping and seaming means in unison.

7. In a machine for forming cooler sections of two sheets or plates of metal, the combination of means for shaping the plates with transverse corrugations, and off-set portions adjacent to their edges enabling the plates to be matched together to form a flat tortuous tube, means for so matching the plates together, means for fastening together the side edges of the plates, and gearing for operating the shaping and fastening means in unison.

8. In a machine for forming cooler sections of two sheets or plates of metal, the combination of means for shaping said plates with transverse corrugations and matching them together to form a flat tortuous tube, means for seaming together the side edges of the plates, and gearing for operating the shaping and seaming means in unison.

9. In a machine for forming cooler sections of two sheets or plates of metal, the combination of means for shaping the plates with transverse corrugations, and off-sets adjacent to the edges of the plates, and for matching said plates together to form a flat tortuous tube, means for seaming together the side edges of the plates, and gearing for operating the shaping and seaming means in unison.

10. In a machine for forming cooler sections of two sheets or plates of metal, the combination of means for shaping the plates with transverse corrugations, slitting the edges of one plate and matching the plates together to form a flat tortuous tube, means for bending the slit edges of one plate over the adjacent edges of the other plate, and gearing for operating the shaping and bending means in unison.

11. In a machine for forming cooler sections of two sheets or sections of metal, the combination of means for separately bending the plates, said means embracing a feeding element, means for matching together the plates in their characteristic relation, means for fastening together the side edges of the plates, said means embracing a feeding element, and a device for maintaining synchronism of operation between the two feeding elements.

12. In a machine for forming cooler sections of two sheets or plates of metal, the combination of means for shaping the plates and matching them together, said means embracing a feeding element, means for fastening together the side edges of the plates, said means also embracing a feeding element, and devices for maintaining synchronism of operation between the two feeding elements.

13. In a machine for forming cooler sections of two sheets or plates of metal, the combination of means for shaping the plates and matching them together, means for joining together the side edges of the plates, both of said means acting to advance the plates through the machine, and devices for maintaining synchronism of operation between the two said means.

14. In a machine for forming cooler sections of two sheets or plates of metal, the combination of shaping means for each sheet, comprising alternating acting dies serving to bend the plates into corrugated form, means for matching the corrugated plates together to form a flat tortuous tube, means for seaming the side edges of said plates, and gearing for operating the shaping and seaming means in unison.

15. In a machine for forming cooler sections of two sheets or plates of metal, the combination of shaping means for each sheet, comprising alternating acting dies serving to bend the sheet into corrugated form and combined feeding and holding elements, means for matching the plates together to form a flat tortuous tube, means for seaming the edges of the plates, said means comprising seaming elements and combined holding and feeding elements, and gearing for driving the parts and maintaining synchronism of operation between the feeding elements of the shaping and seaming means.

16. In a machine for forming cooler sections of two sheets or plates of metal, the combination of means for shaping the plates and engaging them together in the form of a flat tortuous tube, said means including a feeding element, means for seaming the side edges of the plates, said means also including feeding elements, and means for maintaining synchronism of operation between the two said feeding elements.

17. A machine for forming cooler sections of sheets or plates of metal adapted to have the work advanced through it with a uniform movement, and comprising the combination of shaping means acting on the sheets to fit them for assemblage in substantially parallel positions, seaming means for joining the edges of the plates together, the shaping and seaming means having elements acting in unison with the said advance of the work through the machine, and devices for maintaining synchronism of operation between said elements of the shaping and seaming means.

18. A machine for forming cooler sections of sheets or plates of metal adapted to have the work advanced through it with a regular movement, comprising the combination of shaping means acting on the sheets to fit them for engagement with each other at their opposite edges to form a conduit, means for seaming together the edges of the sheets, said shaping and seaming means each comprising elements acting in unison with the advance of the work through the machine, and devices for maintaining synchronism of operation between said elements of the shaping and seaming means.

19. In a machine for forming cooler sections of sheets or plates of metal, the combination of shaping means, comprising shaper jaws, and dies coacting therewith to shape the plates, the jaws also serving to feed the plates, means for seaming the edges of the plates, comprising jaws and seaming tools coacting therewith, the seamer jaws also serving to feed the plates, and means for maintaining synchronism of operation between the shaper and seamer jaws.

20. In a machine for forming cooler sections of sheets or plates of metal, the combination of shaping means fitting the plates for engagement with each other, seamer means for joining together the edges of the plates, the shaper and seamer means both acting also to feed the plates, and means for maintaining synchronism of operation between the shaper and seamer means.

21. In a machine for forming cooler sections of sheets or plates of metal, the combination of shaping means for each sheet, comprising jaws and alternately operating dies coacting therewith, the jaws also serving to feed the plates, seamer means for joining together the edges of the plates, comprising jaws and seamer fingers coacting therewith, the seamer jaws also serving to feed the plates, and mechanism for maintaining synchronism of operation between the shaper and seamer jaws.

22. In a machine for forming cooler sections of plates or sheets of metal, the combination of shaper means for each sheet, comprising jaws and alternately acting dies movable along intersecting lines toward the jaws, the jaws alternately holding the plates during the action of the dies and feeding the plates, seamer means for joining the edges of the plates, said means comprising jaws alternately holding and feeding the plates, seamer fingers coacting with the seamer jaws to bend the edges of one plate over the edges of the other plate, and devices for maintaining synchronism of operation between the shaper and seamer jaws.

23. The combination of two jaws having relative movement toward and from each other to hold the work therebetween, and one of the jaws having movement at an angle to the movement first named to feed the work, a means controlling the engagement of the work with the jaws, a tool coacting with the jaws to operate on the work, and means for driving the operative parts in unison.

24. The combination of two jaws adapted to hold the work between them, and two dies acting along intersecting lines and operating on the work from opposite sides while held by the jaws.

25. The combination of two jaws adapted to hold the work between them, and two dies upon opposite sides of the work and acting along intersecting lines and operating on the work while held by the jaws, said jaws respectively serving as anvils during the action of the jaws.

26. The combination of means for holding the work, said means having a recess therein adjacent the holding surface, a die adapted to operate on the work while held by said means and force a portion thereof into said recess and means for engaging said holding means with said work in a recess formed in the latter by said die.

27. The combination of means for holding the work, said means having a reëntrant angle adjacent the holding surface, a die adapted to engage with the work held by said means and force the same into said reëntrant angle and means for engaging said holding means with said work in a recess formed in the latter by said die.

28. The combination of means for holding the work, said means presenting recesses in the holding surfaces alternately upon opposite sides of the work, two alternately acting dies movable along intersecting lines toward said means to operate on the work and force the same into said recesses and means for engaging said holding means with said work in a recess formed in the latter by said die.

29. The combination of two anvil jaws adapted to hold the work between them, and two alternately acting dies moving along intersecting lines toward the respective jaws.

30. The combination of combined work holding and feeding jaws, means controlling the engagement of the work with said jaws, and a die acting against one of said jaws to shape the work.

31. The combination of combined work holding and feeding jaws having matching teeth, means controlling the engagement of the work with said jaws, and a die coacting with the jaws to shape the work.

32. The combination of two jaws having relative movement toward and from each other to grip and hold the work, and one of the jaws having movement at an angle to the first named movement to feed the work, and means alternately engaging the work with the jaws during the feeding action.

33. The combination of two jaws having relative movement toward and from each other to grip and hold the work therebetween, and one of the jaws having movement at an angle to the first named movement to feed the work, means alternately engaging the work with the jaws during the feeding action, and a die coacting with the jaws to shape the work.

34. The combination of two jaws operating to alternately advance the work and rigidly support the same, and means between the jaws controlling the engagement of the work with the jaws.

35. The combination of two jaws serving to grip the work therebetween and operating to intermittently feed the work, means for retaining the work in engagement with said jaws alternately, and a tool co-acting with the jaws to act on the work.

36. The combination of jaws having relative movement to feed the work, means engaging the work with the jaws alternately during said relative movement, and a tool coacting with the jaws to shape the work.

37. The combination of two jaws having matching teeth and anvil surfaces, said jaws having relative movement toward and from each other to grip and hold the work, and one of the jaws having movement at an angle to the line of the first movement to feed the work, means for engaging the work with said last-mentioned jaw during its feeding movement, and dies coacting with the anvil surfaces of the jaws during the holding period to shape the work.

38. The combination of two jaws having relative movements to alternately hold and feed the work, strippers acting to periodically disengage the work from the jaws alternately, and means for actuating the strippers.

39. The combination of two jaws having relative movements to alternately hold and feed the work, strippers acting periodically to disengage the work therefrom, means for actuating the strippers, and a die coacting with the jaws to shape the work.

40. The combination of two jaws having matching teeth and movable to alternately hold and feed the work, strippers acting periodically to disengage the work from the teeth, and means for operating the strippers.

41. The combination of two jaws having matching teeth and movable to alternately hold and feed the work, strippers acting periodically to disengage the work from the teeth, means for operating the strippers, and a die coacting with the jaws to shape the work during the holding period.

42. The combination of two jaws having matching teeth the jaws having coacting movements and serving to alternately hold and feed the work, and each including a stripper between the teeth thereof, means yieldingly pressing the strippers outward to disengage the work from the teeth, and means for controlling the action of the strippers.

43. The combination of two jaws having matching teeth the jaws having coacting movements and serving to hold and laterally feed the work, and each including a stripper between the teeth thereof, means positively pressing the strippers outward to disengage the work from the teeth, means for controlling the action of the strippers, and a die serving to shape the work during the holding action of the jaws.

44. The combination of a jaw acting to feed the work, a stripper for disengaging the work from said jaw, and means for engaging the work with said jaw, said stripper and means operating alternately.

45. The combination of two coacting jaws serving to feed the work, strippers for disengaging the work from the jaws, and means controlling the action of the strippers and also serving to engage the work with the jaws.

46. The combination of two coacting jaws serving to feed the work, and means intermediate said jaws for engaging the work with the jaws according to the feeding action.

47. The combination of two jaws having coacting movements and operating to alternately hold and feed the work, strippers for disengaging the work from the jaws, and a positively actuated guide for the work having connection with said strippers to control the same.

48. The combination of two jaws having coacting movements and operating to alternately hold and feed the work, strippers for disengaging the work from the jaws, a positively actuated guide for the work having connection with said strippers to control the same, and a die coacting with the jaws to shape the work during the holding action of the jaws.

49. The combination of two jaws having coacting movement and operating to alternately hold and feed the work, a stripper coacting with each jaw, means yieldingly pressing the strippers toward each other, and a positively actuated guide for the work with the opposite sides of which the strippers are engaged, for the purpose specified.

50. The combination of two jaws having coacting movements and operating to alternately hold and feed the work, a stripper coacting with each jaw, means yieldingly pressing the strippers toward each other, a positively actuated guide for the work with the opposite sides of which the strippers are engaged, for the purpose specified, and a die coacting with the jaws to shape the work during the holding action thereof.

51. The combination of two jaws having matching teeth and relative movements alternately to hold and feed the work, stripper plates engaged between the teeth of each jaw, means tending yieldingly to press the stripper plates toward each other, and a positively actuated guide for the work with the opposite sides of which the stripper plates are engaged.

52. The combination of two jaws having matching teeth and relative movement alternately to hold and feed the work, stripper plates engaged between the teeth of each jaw, means tending yieldingly to press the stripper plates toward each other, a positively actuated guide for the work with the opposite sides of which the stripper plates are engaged, and a die coacting with the jaws during the holding operation thereof.

53. The combination of two opposing jaws having coacting movements and operating to alternately hold and feed the work, strippers for each jaw, means yieldingly pressing the strippers toward each other, a movable tubular work holder having an opening through which the jaws operate, said strippers engaging opposite sides of the work holder, and means for periodically moving the work holder, for the purpose specified.

54. The combination of two opposing jaws having coacting movements and operating to alternately hold and feed the work, strippers for each jaw, means yieldingly pressing the strippers toward each other, a movable tubular work holder having an opening through which the jaws operate, said strippers engaging opposite sides of the work holder, means for periodically moving the work holder, for the purpose specified, and a die coacting with the jaws and movable through the opening in the work holder.

55. The combination of two jaws adapted to hold the work therebetween, means for mounting one jaw to move toward and from the other, means for mounting the other jaw to move across the line of movement of the first jaw, means controlling the engagement of the work with said jaws whereby the jaws serve to alternately hold and feed the work, and a die coacting with the jaws to shape the work during the holding action of the jaws.

56. The combination of two jaws, one of said jaws being movable toward and from the other to grip the work therebetween and the other of said jaws being movable across the line of movement of the first jaw after the latter has been moved away from said second jaw, and means for holding the work in engagement with the first jaw during a movement of the second jaw in one direction and holding it in engagement with the second jaw during the movement of the latter in the reverse direction.

57. The combination of two jaws, one of said jaws being movable toward and from the other to grip the work therebetween and the other of said jaws being movable across the line of movement of the first jaw after the latter has been moved away from said second jaw, and means between said jaws for holding the work in engagement with the first jaw during a movement of the second jaw in one direction and holding it in engagement with the second jaw during the movement of the latter in the reverse direction.

58. The combination of two opposing jaws, means mounting one jaw to move toward and from the other, means mounting the other jaw to move across the line of movement of the first jaw and means for alternately engaging the work with the jaws whereby to feed the work.

59. The combination of two opposing jaws, one of the jaws being movable toward and from the other, and the other jaw being movable across the line of movement of the first jaw, means controlling the engagement of the work with the jaws, said jaws serving to alternately hold and feed the work, and a die coacting with the jaws during the holding operation thereof.

60. The combination of a reciprocating jaw arranged to feed the work, a swinging jaw arranged to move toward and from the same to hold the work, and means controlling the engagement of the work with said jaws alternately during the successive movements of the former.

61. The combination of a reciprocating jaw arranged to feed the work, a swinging jaw arranged to move toward and from the same to hold the work, means controlling the engagement of the work with said jaws whereby the jaws serve alternately to hold and feed the work, and a die coacting with the jaws during the holding action thereof to shape the work.

62. The combination of two reciprocating jaws, two swinging jaws movable respectively toward and from the reciprocating jaws, means for reciprocating the reciprocating jaws, a cam acting between the swinging jaws to operate them in unison, and means controlling the engagement of the work with the jaws whereby the jaws serve alternately to hold and feed the work.

63. The combination of two reciprocating jaws, two swinging jaws movable respectively toward and from the reciprocating jaws, means for reciprocating the reciprocating jaws, a cam acting between the swinging jaws to operate them in unison, means controlling the engagement of the work with the jaws whereby the jaws serve alternately to hold and feed the work, and dies coacting with the jaws during the holding operations thereof to shape the work.

64. The combination of a pivoted jaw, means for swinging the same, a second jaw opposing the first jaw, and movable across the line of movement of the same, means for operating the second jaw, strippers coacting with said jaws, a swinging work guide having connection with the strippers to control the action thereof, means for periodically swinging the work guide, and alternately acting dies moving on intersecting lines and acting respectively against the jaws to shape the work.

65. The combination of two groups of corrugating mechanisms, a guide associated with each group, said guides conducting the work sections toward each other, and means receiving the work from the guides for engaging the work sections together.

66. The combination of two groups of work shaping means, a guide associated with each group, said guides conducting the work sections toward each other, and means receiving the work from the guides for engaging the work sections together, said means comprising a tapering guide wall, and opposing assembling rolls between which and said wall the work is moved.

67. The combination of two groups of shaping devices respectively adapted to operate on the work sections to corrugate the same, means for matching the corrugated sections together, and guiding means for delivering the work sections to said means for matching them together.

68. The combination of two groups of shaper mechanism, each adapted to corrugate metal plates, means for matching said corrugated plates together, and work guiding devices leading the plates to said means for matching them together.

69. The combination of two groups of shaper mechanism, each group comprising shaper jaws coacting to feed and hold the plate, a die coacting with the jaws, a means for disengaging the plate from the jaws, and a movable guide having connection with the said means for disengaging the plate from the jaws, means for actuating the shaper mechanisms and guides and means for matching together the two plates to which last named means the two guides lead.

70. The combination of two groups of shaper mechanism, each group comprising shaper jaws coacting alternately to feed and hold the plate, a die coacting with the jaws, a means for disengaging the plate from the jaws, and a movable guide having connection with the said means for disengaging the plate from the jaws, means for actuating the shaper mechanisms and guides and means for matching together the two plates to which last named means the two guides lead, said means for matching together the two plates comprising a tapering guide and assembling rolls facing the same.

71. The combination of coacting holding jaws capable of receiving between them substantially parallel matching plates and advancing said plates intermittently, and a seamer tool co-acting with the jaws to join edges of said plates together.

72. The combination of engaging jaws capable of receiving two substantially parallel plates between them and advancing said plates intermittently, and a tool co-acting with the jaws to turn the edge of one plate over the corresponding edge of the other plate.

73. The combination of means for holding corrugated plates, means co-acting therewith to seam the edges of said plates along the longitudinal portions of the corrugations and separate means for seaming the edges of said plates along the transverse portions of the corrugations.

74. The combination of coacting jaws capable of receiving between them corrugated plates, a seamer tool coacting with the jaws to seam the longitudinal or horizontal bends of the plates, and a second seamer tool coacting with the jaws to seam the vertical or transverse bends of the plate.

75. The combination of means for holding corrugated plates, and seamer tools coacting therewith to seam the edges of said plates one of said tools operating longitudinally of said plates and another of said tools operating transversely of the plates to seam separate portions.

76. The combination of coacting holding jaws capable of receiving the work between them, and acting alternately to hold and feed the same, and a seamer tool coacting with the jaws during the holding action.

77. The combination of coacting jaws capable of holding two plates between them, said jaws acting to alternately hold and feed the work, and a seamer tool coacting with the jaws to seam the edges of said plates.

78. The combination of coacting holding jaws capable of receiving between them two sheets or plates of metal, and a seamer tool at each side of said jaws and coacting with the respective edges of said plates to seam them together and form a tube of said plates.

79. The combination of means for holding two metal plates juxtaposed, and a tool at each side of said means and coacting therewith to seam together the side edges of the plate to form a tube.

80. The combination of means for holding two matched corrugated plates, and a tool at each side of said means and coacting therewith to seam together the side edges of the plates to form a flat tortuous tube.

81. The combination of coacting jaws capable of receiving two sheets or plates of metal between them, the jaws acting alternately to hold and feed the work, and a seamer tool located at each side of the jaws and coacting with the respective edges of the plate to seam the same and form a tube of the plates.

82. The combination of coacting jaws capable of receiving between them two corrugated metal sheets or plates, said jaws acting alternately to hold and feed the plates, and two seamer tools at the sides of said jaws, one tool at each side serving to seam the longitudinal or horizontal bends of the plates, and the other tool at each side of the jaws serving to seam the vertical or transverse bends of the plates, whereby to form a flat tortuous tube.

83. The combination of two jaws capable of receiving between them corrugated metal plates or sheets, a seamer tool coacting with the jaws and serving to seam the vertical or longitudinal edges of one plate over the corresponding edges of the other plate, and a second seamer tool coacting with the jaws, comprising coacting fingers serving to bend or seam the vertical or transverse edges of the one plate over the corresponding edges of the other plate.

84. The combination of two coacting jaws serving to hold the edges of two metal plates adjacent each other and feed said plates in the general direction of said edges, and a tool juxtaposed to said jaws and acting on the edges of said plates.

85. The combination of two coacting jaws serving to hold the edges of two metal plates adjacent each other and feed said plates in the general direction of said edges, and a tool juxtaposed to said jaws and acting on the edges of said plates to secure the same together.

86. The combination of coacting jaws serving to alternately hold and feed the work, means coacting with the jaws to control the engagement of the work therewith as the jaws are separated, means for automatically operating the first means, and a tool coacting with the jaws to operate on the work.

87. The combination of coacting jaws serving to alternately hold and feed the work, stripper plates respectively for said jaws, a guide in connection with said plates, means for automatically operating the guide through the medium of one of the jaws, and a tool acting with the jaws to operate on the work.

88. The combination of two jaws acting to alternately hold and feed the work, means for controlling the engagement of the work with the jaws, means for automatically actuating the first means, and a tool coacting with the jaws and operating on the edge of the work.

89. The combination of coacting jaws having intermeshing teeth and adapted to hold and feed the work, means controlling engagement of the work with the jaws, and a seamer tool coacting with the jaws to seam the work.

90. The combination of coacting toothed jaws arranged in two pairs respectively adapted to engage the edge portions of the work, means acting between the pairs of jaws to control the engagement of the work with the jaws, and a tool coacting with the jaws to act on the work.

91. The combination of coacting toothed jaws serving alternately to hold and feed the work, stripper plates engaged between the teeth of said jaws, a guide in connection with the stripper plates, means operating the guide through the medium of the jaws, and a tool coacting with the jaws to operate on the work.

92. The combination of opposing jaws having interengaging teeth, the jaws serving alternately to hold and feed the work, stripper plates engaged between the teeth of said jaws, means yieldingly pressing the stripper plates toward each other, a guide with which the strippers are connected, means controlling the movements of the guide, and a tool coacting with the jaws to operate on the work.

93. The combination of two jaws adapted to engage the work, a gravity member adapted to control engagement of the work with the jaws, a means for periodically locking said member with one jaw, for the purpose specified, and a tool coacting with the jaws to operate on the work.

94. The combination of two coacting jaws serving alternately to hold and feed the work, a gravity member adapted to control engagement of the work with the jaws, means for periodically locking said member with one of the jaws, for the purpose specified, and a tool coacting with the jaws to operate on the work.

95. The combination of opposing jaws having relative movement toward and from the other, one jaw having movement across the line of said relative movement, whereby said jaws serve alternately to hold and feed the work, a member coacting with the jaws to control engagement of the work therewith, means for periodically locking said member with one of the jaws for the purpose specified, and a tool coacting with the jaws to operate on the work.

96. The combination of opposing jaws having relative movement toward and from each other, and one of the jaws having movement across the line of movement first named, whereby the jaws serve alternately to hold and feed the work, stripper plates acting with the jaws, a guide having connection with the stripper plates, latches serving removably to connect the stripper with the other jaw, and means for automatically operating the latches.

97. The combination of opposing jaws having relative movement toward and from each other, and one of the jaws having movement across the line of movement first named, whereby the jaws serve alternately to hold and feed the work, stripper plates acting with the jaws, a guide having connection with the stripper plates, latches serving removably to connect the stripper with the other jaw, means for automatically operating the latches, and a tool coacting with the jaws to operate on the work.

98. The combination of coacting jaws having relative movement toward and from each other, and one of the jaws having movement across the line of the first named movement whereby the jaws serve alternately to hold and feed the work, strippers coacting with the jaws, a guide having connection with the strippers, and means automatically controlling the action of the guide.

99. The combination of coacting jaws having relative movement toward and from each other, and one of the jaws having movement across the first named line of movement whereby the jaws serve alternately to hold and feed the work, strippers coacting with the jaws, a guide having connection with the strippers, and automatic means for periodically locking the guide with the other jaw.

100. The combination of a frame, a jaw having vertical movement therein, means for actuating the jaw, a carriage having horizontal movement in the frame, a jaw having vertical movement in the carriage, and means for operating the carriage and second jaw, said jaws coacting to hold and feed the work.

101. The combination of a frame, a jaw having vertical movement therein, means for actuating the jaw, a carriage having horizontal movement in the frame, a jaw having vertical movement in the carriage, means for operating the carriage and second jaw, said jaws coacting to hold and feed the work, and means controlling engagement of the work with the jaws during the feeding operation.

102. The combination of a frame, a jaw having vertical movement therein, means for actuating the jaw, a carriage having horizontal movement in the frame, a jaw having vertical movement in the carriage, means for operating the carriage and second jaw, said jaws coacting to hold and feed the work, and a tool coacting with the jaws to operate on the work.

103. The combination of a frame, a jaw having vertical movement therein, means for actuating the jaw, a carriage having horizontal movement in the frame, a jaw having vertical movement in the carriage, means for operating the carriage and second jaw, said jaws coacting to hold and feed the work, means controlling engagement of the work with the jaws during the feeding operation, and a tool coacting with the jaws to operate on the work.

104. The combination of a frame, a jaw having vertical movement therein, means for operating the jaw, a carriage having vertical movement in the frame, means for operating the carriage, a jaw having vertical movement in the carriage, means for operating the second jaw, the two jaws opposing each other to hold and feed the work, strippers coacting with the jaws, a guide connected with the strippers, and automatic means for periodically connecting the guide with the first named jaw.

105. The combination of a frame, a jaw having vertical movement therein, means for operating the jaw, a carriage having vertical movement in the frame, means for operating the carriage, a jaw having vertical movement in the carriage, means for operating the second jaw, the two jaws opposing each other to hold and feed the work, strippers coacting with the jaws, a guide connected with the strippers, automatic means for periodically connecting the guide with the first jaws to operate on the work.

106. The combination of means for holding two plates substantially parallel and with the edge of one projecting beyond the edge of the other, and a tool coacting with said means for holding the plates, the tool and holding means being relatively and alternately movable along crossing lines to bend the said projecting edge of the first plate laterally toward the second plate, and thence inward over the second plate to seam the edges of the plates.

107. The combination of coacting means for holding the work therebetween, a tool adapted to engage the work, said tool being movable toward and from the same, and the said means for holding the work and tool being relatively movable across the line of movement of the tool and means for moving said holding means and said tool alternately.

108. The combination of means for holding and moving the work, a tool adapted to engage the work and movable toward and from the same on a line intersecting the line of movement of the said means for holding and moving the work and means for moving said holding means and said tool alternately.

109. The combination of a tool movable into and out of active position, a work holding means movable across the line of movement of the tool and means for moving said holding means and said tool alternately.

110. The combination of a tool movable into and out of active position, work holding jaws movable across the line of movement of the tool, one of said jaws projecting beyond the other to form an anvil surface and means for moving said holding means and said tool alternately.

111. The combination of a tool having working surfaces lying in different planes, the tool being movable into and out of active position, and jaws having co-acting teeth and adapted to hold a corrugated plate and movable past the tool to engage the plate with said working surfaces of the tool.

112. The combination of a tool having working surfaces lying in different planes, the tool being movable toward and from the work to active or inactive position, the jaws adapted to hold a corrugated plate and movable past the tool to engage the plate with said working surfaces of the tool, one of the jaws projecting beyond the other to form an anvil surface.

113. The combination of a tool movable in the plane of the work and toward and from the work to active or inactive position, a work holder movable past the tool and having an anvil surface, and means for returning the work holder to bind the work between the tool and anvil surface.

114. The combination of a work holder having an anvil surface, means for moving the work holder back and forth in a fixed line, and a tool movable toward and from the work holder at an angle to the line of movement thereof, and adapted at one period of the operation to assume a position opposite the anvil surface, and force the work into engagement therewith upon the following movement of the work holder.

115. The combination of opposing jaws adapted to hold the work between them, one of the jaws having a portion projecting beyond the other jaw and forming an anvil surface, means for moving the jaws back and forth in a fixed line, and a tool movable toward and from the jaws at an angle to the line of movement thereof, said tool being capable of occupying a position in the path of the anvil surface, for the purpose specified.

116. The combination of means for holding the work, and coacting seamer fingers movable toward and from the work substantially in the plane of the work and simultaneously toward and from each other.

117. The combination of means for holding the work, and coacting seamer fingers movable toward and from the work and simultaneously toward and from each other, said fingers having recesses therein to receive the seam produced by the fingers.

118. The combination with means for holding the work, of seamer fingers coacting therewith and adapted to move simultaneously toward and from the work and toward and from each other to seam the work, and means for spreading the fingers when engaged with the work to press the seams against the work holder and clench the same.

119. The combination of means for holding corrugated plates, matched together with the edge of one plate overlapping the corresponding edge of the other plate, and independent sets of seamer tools adapted to coact with opposite portions of the overlapping edge of one plate to bend said portion inward around the corresponding portion of the edge of the other plate.

120. The combination of means for holding corrugated metal plates matched together, with the edges of one plate overlapping the edges of the other, and seamer fingers movable toward and from the edges of the plates and simultaneously toward and from each other in the general direction of said plates, and serving to engage two opposing portions of the overlapping edge and bend the same inward around the corresponding edge of the other plate.

121. The combination of means for holding work, which presents edges intersecting substantially at right angles to each other, and separate seaming means for said edges independently.

122. The combination of means for holding work which presents edges intersecting substantially at right angles to each other, and separate seaming means coöperating with said holding means for seaming each of said edges independently.

123. In a machine for forming corrugated conduits of two sheets of metal, the combination of means for separately shaping the sheets, guides receiving the plates from the separate shaping means, and assembling means receiving the plates from both of said guides.

124. In a machine for forming corrugated conduits of two sheets or plates of metal, the combination of means for separately shaping the plates with transverse corrugations, and assembling rollers receiving the plates from both of said shaping means.

125. In a machine for forming corrugated conduits of two sheets or plates of metal, the combination of two guides receiving the separately corrugated plates, said guides intersecting at an angle, and assembling means for bringing the plates to their proper position and disposed adjacent the intersection of said guides.

126. In a machine for forming corrugated conduits of two sheets or plates of metal, the combination of a pair of assembling rollers and guides for directing the previously corrugated plates to said rollers along lines approximately parallel to the circumferences of said rollers, whereby the corrugations are opened to facilitate assembling.

127. The combination of means for holding work, which presents an edge having portions along the length thereof extending at an angle to the general direction of the edge, and intermediate portions at an angle to the first-mentioned portions, means for seaming the first-mentioned portions of said edge, and separate means for seaming the last-mentioned portions of said edge.

128. In a machine for forming conduits of two sheets or plates of metal, the combination of means for separately shaping the plates to offset the edges of one of the plates, means for assembling the plates, and means for simultaneously seaming the two edges of one of said plates over the corresponding edges of the other of said plates.

129. In a machine for forming conduits of two sheets or plates of metal, comprising two separate sets of forming means for acting upon the two sheets of metal, assembling means for moving said sheets into juxtaposition, and two separate sets of seaming mechanisms for seaming successive portions of the adjacent pairs of parallel edges of the sheets, the sheets being fed to the forming means, the assembling means and the seaming means, successively.

130. In a machine for forming conduits of two sheets or plates of metal, comprising two separate sets of forming means for acting upon the two sheets of metal, assembling means for moving said sheets into juxtaposition, two separate sets of seaming mechanisms for seaming successive portions of the adjacent pairs of parallel edges of the sheets, the sheets being fed to the forming means, the assembling means and the seaming means, successively, and means for operating said forming means, said assembling means and said seaming means simultaneously.

131. In a machine for forming conduits of two sheets or plates of metal, the combination of two sets of mechanisms acting, respectively, upon the two plates to give said plates the desired form, means for assembling the plates to bring them into juxtaposition with the two parallel edges of one plate adjacent to the two parallel edges of the other plate, and two separate seaming mechanisms, between which said plates pass after assembly, one of said seaming mechanisms acting to seam together one pair of juxtaposed edges and the other seaming mechanism operating to seam together the other pair of juxtaposed edges.

132. In a machine for forming conduits of two sheets or plates of metal, the combination of means for forming one of the sheets to present a series of transverse folds, means for bringing a second sheet into juxtaposition therewith with its opposite parallel edges adjacent to the opposite parallel edges of the first-mentioned plate, and two separate seaming mechanisms for acting upon the pairs of adjacent edges for securing said plates together.

In testimony whereof I have signed my name to this specification in the presence of two subscribing witnesses.

D McRA LIVINGSTON.

Witnesses:
JNO. M. RITTER,
ISAAC B. OWENS.